United States Patent
Nguyen et al.

(10) Patent No.: US 9,553,951 B1
(45) Date of Patent: Jan. 24, 2017

(54) SEMAPHORES IN DISTRIBUTED COMPUTING ENVIRONMENTS

(71) Applicant: Amazon Technologies, Inc., Reno, NV (US)

(72) Inventors: Long Xuan Nguyen, Seattle, WA (US); Michael Benjamin Deardeuff, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 722 days.

(21) Appl. No.: 13/869,902

(22) Filed: Apr. 24, 2013

(51) Int. Cl.
H04L 29/06 (2006.01)

(52) U.S. Cl.
CPC .................................. H04L 67/42 (2013.01)

(58) Field of Classification Search
CPC .. H04L 67/2852; H04L 12/1822; H04L 47/10; H04L 63/08; H04L 63/10
USPC ....... 709/201, 202, 204, 205, 217, 219, 227, 709/229
See application file for complete search history.

(56) References Cited

U.S. PATENT DOCUMENTS

| | | | |
|---|---|---|---|
| 4,665,520 A | 5/1987 | Strom et al. | |
| 4,928,222 A | 5/1990 | Vriezen et al. | |
| 5,261,085 A | 11/1993 | Lamport | |
| 5,261,106 A | 11/1993 | Lentz et al. | |
| 5,301,309 A | 4/1994 | Sugano | |
| 5,522,029 A | 5/1996 | Hatfield | |
| 5,802,267 A | 9/1998 | Shirakihara et al. | |
| 5,845,292 A | 12/1998 | Bohannon et al. | |
| 5,923,832 A | 7/1999 | Shirakihara et al. | |
| 6,105,148 A | 8/2000 | Chung et al. | |
| 6,332,200 B1 | 12/2001 | Meth et al. | |
| 6,529,933 B1 | 3/2003 | Montgomery et al. | |
| 7,152,124 B1 | 12/2006 | Puri et al. | |
| 7,249,280 B2 | 7/2007 | Lamport et al. | |
| 7,290,056 B1 * | 10/2007 | McLaughlin, Jr. . | H04L 43/0852 709/201 |
| 7,426,653 B2 | 9/2008 | Hu et al. | |
| 7,792,980 B2 | 9/2010 | Eshel et al. | |
| 7,937,616 B2 | 5/2011 | Armstrong et al. | |
| 7,984,439 B2 | 7/2011 | Mcconnell | |
| 8,006,124 B2 | 8/2011 | Park et al. | |
| 8,042,102 B2 | 10/2011 | Dewitt, Jr. et al. | |

(Continued)

OTHER PUBLICATIONS

U.S. Appl. No. 13/528,301, filed Jun. 20, 2012, Long X. Nguyen et al.
U.S. Appl. No. 13/528,249, filed Jun. 20, 2012, Long X. Nguyen et al.
U.S. Appl. No. 13/528,340, filed Jun. 20, 2012, Long X. Nguyen.

(Continued)

*Primary Examiner* — Edward Kim
(74) *Attorney, Agent, or Firm* — Robert C. Kowert; Meyertons, Hood, Kivlin, Kowert & Goetzel, P.C.

(57) ABSTRACT

Methods and apparatus for a semaphore mechanism in a distributed computing environment are disclosed. A state manager coordinating accesses to objects from distributed clients implements programmatic interfaces for semaphore operations. A client process submits a permit record directed to a semaphore instance protecting a shared resource. The client process receives a representation of permit records associated with the resource. The permit records provide an indication of an order in which permit requests for the resource were processed. The client process uses the permit records to determine whether it has been granted a permit, and if it determines that the permit has been granted, performs operations on the resource.

26 Claims, 11 Drawing Sheets

(56) References Cited

U.S. PATENT DOCUMENTS

| | | | |
|---|---|---|---|
| 8,108,712 B1 | 1/2012 | Carlino et al. | |
| 8,108,733 B2 | 1/2012 | Richmond | |
| 8,806,502 B2* | 8/2014 | Gargash | G06F 9/466 |
| | | | 709/229 |
| 2003/0221124 A1* | 11/2003 | Curran | H04L 63/10 |
| | | | 726/12 |
| 2004/0015668 A1* | 1/2004 | McBrearty | H04L 63/10 |
| | | | 711/163 |
| 2004/0068733 A1* | 4/2004 | Longbardi | G06F 9/541 |
| | | | 719/316 |
| 2004/0133577 A1* | 7/2004 | Miloushev | G06F 11/1076 |
| 2004/0133652 A1* | 7/2004 | Miloushev | G06F 11/1076 |
| | | | 709/214 |
| 2004/0226023 A1* | 11/2004 | Tucker | G06F 9/54 |
| | | | 719/315 |
| 2004/0255048 A1* | 12/2004 | Lev Ran | G06F 9/546 |
| | | | 709/249 |
| 2006/0136781 A1 | 6/2006 | Lamport | |
| 2006/0179059 A1 | 8/2006 | Reed et al. | |
| 2007/0174541 A1 | 7/2007 | Chandrasekaran et al. | |
| 2009/0287720 A1 | 11/2009 | Herter et al. | |
| 2009/0327807 A1 | 12/2009 | Varadarajan et al. | |

OTHER PUBLICATIONS

U.S. Appl. No. 13/625,506, filed Sep. 24, 2012, Nirmal Mehta, et al.

U.S. Appl. No. 13/770,569, filed Feb. 19, 2013, Bryan James Donlan.

"Future (Java 2 Platform SE 5.0)" 2004/2010 Oracle and/or its affiliates, downloaded from docs.oracle.com/javase/1.5.0/docs/api/java/util/concurrent/Future.html pp. 1-4.

"Restoring Consistent Global States of Distributed Computations" Goldberg, et al, 1991 ACM pp. 1-11.

"The Chubby Lock Service for Loosely-coupled Distributed Systems" Mike Burrows, 2006 Google inc. pp. 335-350.

"Transparent Checkpoint-Restart of Distributed Applications on Commodity Clusters" Laaden, et al., Appears in Proceedings of the 2005 IEEE International Conference on Cluster Computing (Cluster 2005), Boston, MA Sep. 26-30, 2005.

"Distributed Checkpointing: Analysis and Benchmarks" Gustavo M. D. Vieira and Luiz E. Buzato, partially supported by CAPES under grant No. 01P-15081/1997, pp. 1-16.

"Paxos Made Live—An Engineering Perspective" Chandra, et al, Jun. 20, 2007, pp. 1-16.

"Paxos Made Simple" Leslie Lamport, Nov. 1, 2001, pp. 1-14.

* cited by examiner

SEMAPHORES IN DISTRIBUTED COMPUTING ENVIRONMENTS

BACKGROUND

Implementing computing systems that manage large quantities of data and/or service large numbers of users often presents problems of scale. For example, as demand for various types of computing services grows, it may become difficult to service that demand without increasing the available computing resources accordingly. To facilitate scaling in order to meet demand, a particular computing service might be implemented as a distributed application that executes on a number of instances of computing hardware. For example, a number of different software processes executing on different computer systems may operate cooperatively to implement the computing service. When more service capacity is needed, additional hardware or software resources may be deployed.

However, implementing distributed applications may present its own set of challenges. For example, in a geographically distributed system, it is possible that different segments of the system might become communicatively isolated from one another, e.g., due to a failure of network communications between sites. As a consequence, the isolated segments may not be able to coordinate with one another. If care is not taken in such circumstances, inconsistent system behavior might result (e.g., if the isolated segments both attempt to modify data that they would ordinarily coordinate access to).

More generally, the larger the distributed system, the more difficult it may be to coordinate the actions of various actors within the system (e.g., owing to the difficulty of ensuring that many different actors that are potentially widely distributed have a consistent view of system state). In some distributed systems, fairly sophisticated lock managers or state managers may be implemented to help manage concurrent accesses to some types of shared resources, e.g., by providing support for mutual exclusion locks. However, in many cases, a lock mechanism that only allows one entity to hold the lock at a time may not be appropriate for some types of operations being implemented by distributed applications.

Figure 1:
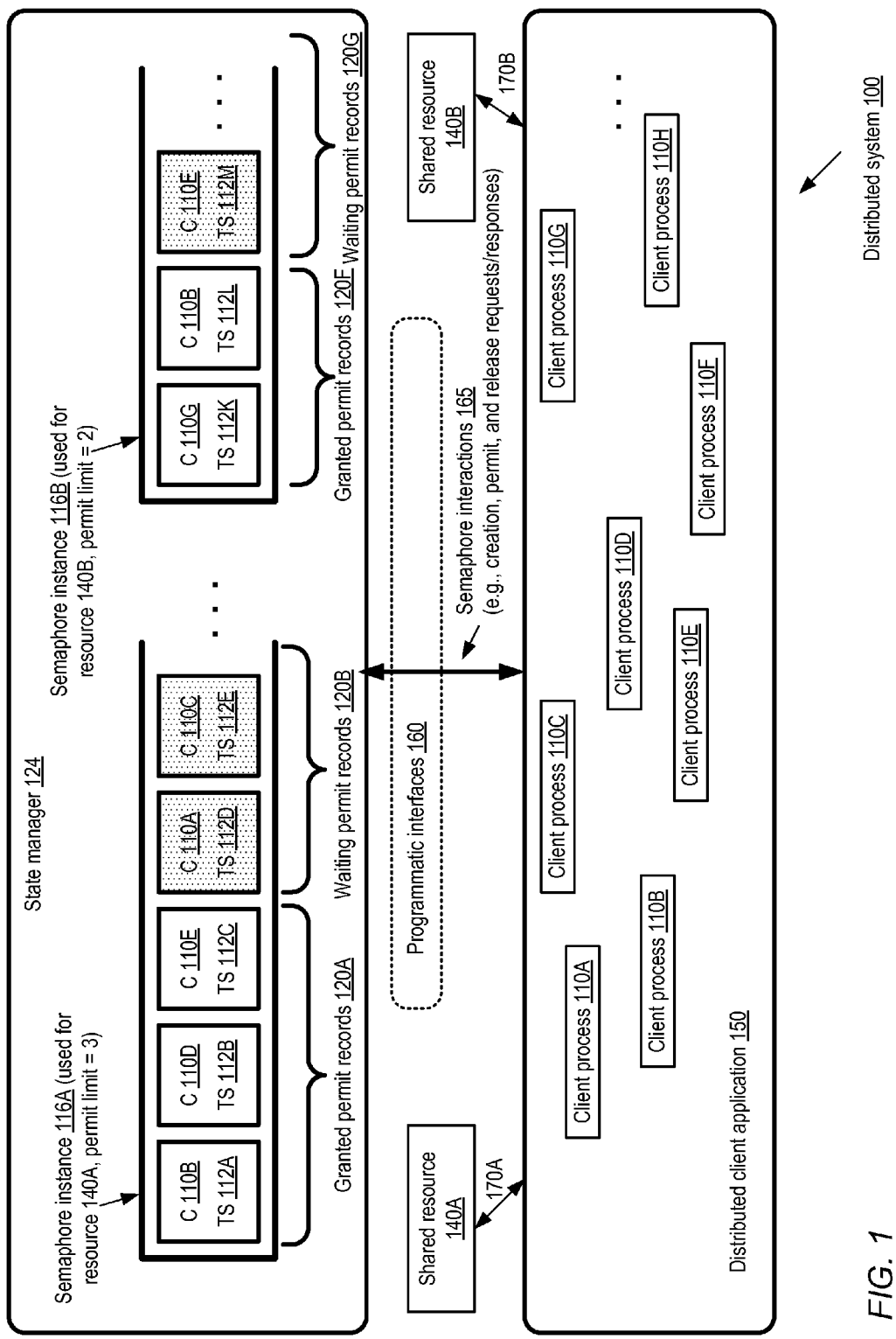
FIG. 1 illustrates an example distributed system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing counting semaphore mechanisms in distributed computing environments are described. Generally speaking, a semaphore may be defined as a programmatic construct that provides an abstraction for controlling access by multiple entities or processes to a common resource in a parallel programming or multi-user environment. Semaphore mechanisms that enable an arbitrary number of entities to access a resource safely (e.g., without race conditions that could leave the resource in an unpredictable or inconsistent state) may be termed "counting" semaphores. Semaphore mechanisms that only allow one entity at a time to access a resource safely, and thus serve as the logical equivalents of mutual exclusion locks, may be termed "binary" semaphores. Counting semaphores may thus be considered a superset of binary semaphores; i.e., an implementation that supports counting semaphores may easily support binary semaphores. In the following description, the term "semaphore" may be used synonymously with the term "counting semaphore".

The problem of implementing semaphore mechanisms that can be used by distributed software applications may be complicated by the fact that such applications may comprise multiple concurrent and often autonomous processes, communicating with one another and/or with shared resources across one or more networks. For example, a distributed computing application such as a distributed storage service or a large-scale parallelized scientific computing application may include multiple concurrent processes. Various ones of these processes may be executing on different physical and/or logical (e.g., virtual) resources or platforms at any given time, and the number of resources involved in the application or service may change over time.

In order for the concurrent processes of a distributed application to cooperate successfully, it may sometimes be necessary for one or more of the processes to gain exclusive access to a given shared resource for a given period of execution. The shared resource may include, for example, administrative or data state information of the distributed application. In one example scenario, a distributed application may store group membership records in a shared repository, such as a respective record for each currently-running "worker" node of the application. If one or more worker nodes fail or lose communication with the other nodes, corrective action may need to be taken (such as adding replacement worker nodes, and/or initiating repair of the failed nodes). Initiating the corrective actions may itself be a distributed function—e.g., any of a number of monitoring nodes or processes may be able to initiate the corrective actions. In order to perform the corrective actions effectively (e.g., to avoid duplicating corrective actions), a consistent view of the group membership records may be required for the monitoring nodes. In addition to administrative information, application data for distributed applications may also require consistency mechanisms. For providing exclusive access to a shared resource, a mutual exclusion mechanism or lock may suffice.

In many cases, however, more than one process may need access to a shared resource at the same time. For example, a service may wish to allow up to N worker processes to perform useful work at a time, and those N processes may need to access shared metadata of the service. In a cloud computing environment, where large numbers of similar tasks (such as machine image deployments to hundreds or thousands of distributed hosts, or retrieval of distributed computation results from hundreds or thousands of compute servers) sometimes need to be performed with at least some degree of parallelism, multiple processes may also need access to shared state information. In some embodiments, accordingly, a distributed semaphore mechanism built using state management primitives such as namespace directories and/or mutex locks may be employed, as described below.

To facilitate consistent sharing of administrative and/or data state among the multiple concurrent processes of a distributed application, the distributed application may employ the services of a state manager (SM). A state manager may implement a repository or registry in which various types of state information of the distributed application may be stored. Each of the constituent processes of the distributed application may be deemed a client process of the state manager in some embodiments. The term "client" may be used synonymously with the term "client process" herein. Each client process may interact with the state manager to update various elements of the state information, and to coordinate access to state information shared with other constituent processes. In some embodiments, the state manager may natively support a number of different types of locking operations, such as mutual exclusion (mutex) locks on objects identified by a respective pathname within a namespace. The SM may provide client libraries that provide application programming interfaces (APIs) to support semaphores, even though, at least in some embodiments, the SM itself may not implement semaphores as primitives—that is, in such embodiments, the client library may utilize other primitives and abstractions natively supported by the SM (such as namespace directories and global timestamps for transactions), to provide support for counting semaphores. To a given client process in some such embodiments, it may appear that the SM natively supports semaphores as full-fledged or first-class objects, but at least some aspects of the semaphore-related operations (such as determining whether a client's request for a semaphore has been granted or not) may be performed by components of the client library.

The registry itself may comprise a number of natively-supported primitive objects organized into one or more namespaces in at least some embodiments. For example, the registry may be used to store a representation of each mutex lock as a respective object with a unique path within a corresponding namespace, and the identity of a process (if any) that is currently holding the lock. In various embodiments, the registry may also contain other types of elements, such as lockable data entries (i.e., software objects containing data values representing shared state information) and/or session objects representing currently active interactions between the client processes and the state manager. A session object may be used, for example, to track the most recent time a communication was received from a particular client process, and may thus serve as an indicator of the health state of the client process. In at least some embodiments, support for semaphores may be implemented using the natively-supported primitive objects—e.g., instances of semaphore mechanisms may be represented as respective directories, or as locks with requester queues, within a registry namespace, as described below and illustrated in FIG. 5 and FIG. 6. The term "semaphore mechanism" may be used herein to refer to a set of operation types supporting semaphore semantics and the software and/or hardware modules used to implement the operations, while the terms "semaphore" or "instance of a semaphore mechanism" may indicate a particular named object on which operations of those types can be invoked. In some embodiments, the semaphores (and/or the mutex locks) supported by the SM may be advisory, in that the SM may not actually attempt to enforce the limits on the entities accessing the corresponding shared resources. Instead, the state manager may rely upon client processes to cooperate with one another and to respect the semaphore (or mutex) semantics. To perform various access operations (e.g., reads, writes) to shared resources protected by a semaphore, for example, a client process may first submit a request for a permit, and only perform the access operations if the client process determines, using the appropriate semantics, that the permit is granted. Internally, the SM may maintain permit records corresponding to the permit requests received in at least some embodiments using one or more registry objects.

In some embodiments, at least a portion of a state manager may itself be implemented as multiple processes or nodes executing across multiple systems as a distributed state manager application. Such a state manager may be referred to herein as a distributed state manager (DSM). A DSM may provide various benefits over a non-distributed state manager, such as higher availability and/or throughput. For example, a DSM implemented on a cluster of computers may allow a client process to interact with any of a plurality of the computers in order to acquire and/or release semaphore permits. Thus, the DSM may be more resilient in case of a hardware and/or software malfunction. Additionally, a DSM may facilitate higher throughput of acquisition/release operations by utilizing collective resources from multiple machines. In addition to semaphore-related and locking-related functions, a DSM may also provide a number of other types of functions in some embodiments, such as, for example, monitoring client application nodes, state information cache enablement, data transfers or replication, and the like. A state manager that is used mainly or exclusively for its locking functionality may be referred to as a lock manager, and a DSM that is used mainly or exclusively for its locking functionality may be referred to as a distributed lock manager or DLM. A number of different types of computing devices may be used singly or in combination to implement the nodes of a DSM in different embodiments, including general purpose or special purpose computer servers, storage devices, networking devices and the like. The repository or registry in which state information is stored may be implemented using a number of different techniques in various embodiments, including for example as a logical or virtual object managed collectively by the nodes of the DSM in some embodiments, as described below in further detail.

In at least some embodiments, as noted above, client processes may interact with the nodes of a DSM using client-side library components of the DSM—e.g., libraries that may be installable on computing devices where the client processes run, and that expose state management application programming interfaces or APIs supported by the DSM. In such embodiments, the nodes of the DSM, to which communication from the client processes may be enabled via the client-side library components, may be referred to as "server" nodes of the DSM. A DSM may thus comprise server-side nodes as well as client-side library components in some embodiments. The server nodes of a DSM may use various protocols (such as consensus-based protocols in which a plurality of server nodes collectively make decisions) to ensure that updates to state information from various client processes are managed appropriately, as also described below in further detail.

According to at least one embodiment, a DSM may implement a set of programmatic interfaces such as application programming interfaces (APIs) defining various types of operations on a semaphore mechanism. The interfaces may, for example, be packaged in the form of a client component library accessible to various processes of distributed client applications. In one embodiment, an instance S1 of a semaphore mechanism may be created at the request of one client process using one of the interfaces. The creation request may indicate a name (such as a pathname) to be associated with the semaphore instance (e.g., a meaningful name may be selected to indicate the resource being protected), and a maximum number of processes N that may concurrently access the resource R1 to be protected using S1. The maximum number of processes N that may concurrently access the resource R1 protected by the semaphore instance S1 may also be referred to as the "permit count" of S1 herein.

Any given client process CP of the application may submit, e.g., using another one of the interfaces, a permit request directed to S1 to obtain access to R1 in some embodiments. In response, in some embodiments CP may receive an indication or representation of one or more permit records associated with S1, including one particular permit record PR-CP corresponding to CP's own permit request. Each of the permit records may include a global timestamp generated by the DSM indicative of an order in in which one or more permit requests to obtain access to R1 were processed by the state manager. Thus, for example, if S1 already had two earlier permit requests directed to it before CP's request was received, the response to the permit request may include indications or representations of three permit records—two generated by the DSM prior to CP's request, and one (PR-CP) corresponding to CP's request. The DSM may generate a global timestamp unique to each permit request received in some embodiments, and store the timestamp in the permit record associated with the permit request. Details regarding global timestamp mechanisms that may be supported at the DSM in some embodiments are provided below. In at least some embodiments, the set of permit records may provide an indication of the global order in which permit requests were processed without requiring the use of global timestamps—e.g., instead of timestamps, a sequence number may be used, or a data structure with implicit ordering semantics (such as an ordered list of permit records that does not include explicit timestamps) may be provided to the client process. Thus, information about the global order in which permit requests were processed may be provided to the client process via a representation of permit records including timestamp values in some embodiments, and without providing timestamp values in other embodiments.

The client process CP may determine, based at least in part on the indication(s) of the permit records, whether it is granted access to the resource. If CP is granted access, CP may proceed to perform one or more operations on R1. For example, in one embodiment, a client library component invoked by CP may arrange the permit records in ascending order of global timestamps, and check whether CP's own permit record PR-CP is in the first N permit records in the ordered list, where N is the maximum number of client processes allowed to access R1. If PR-CP is within the first N in the ordered list, the semantics of counting semaphores such as S1 would imply that CP may access the resource R1.

Figure 5:
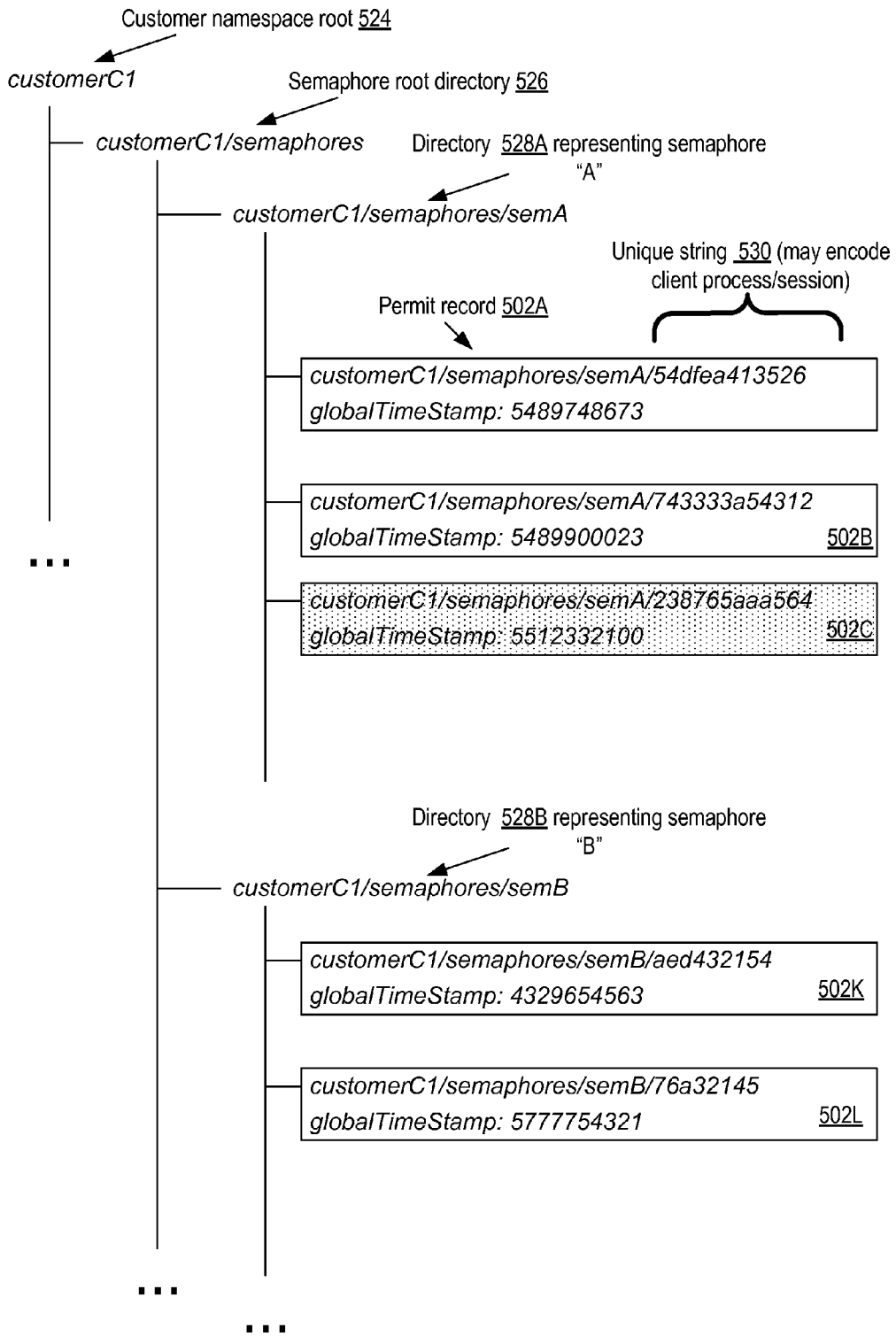
FIG. 5 illustrates example contents of a registry directory associated with a semaphore instance, according to at least some embodiments.
Figure 6:
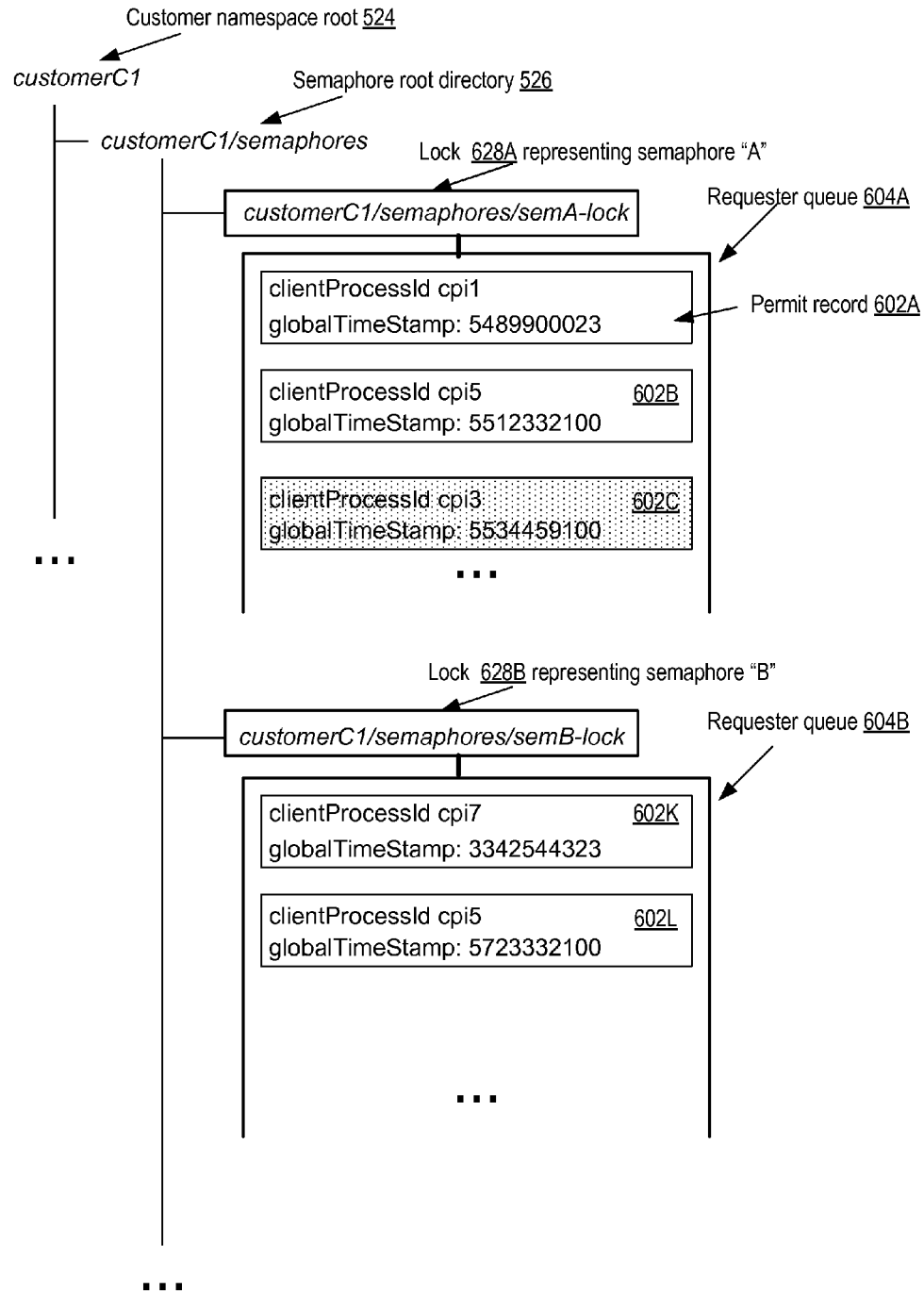
FIG. 6 illustrates example lock objects that may be used to represent respective semaphore instances, according to at least some embodiments.

After CP performs its operations in this example, it may no longer need access to R1, and may send a permit release request via another client-side library component of the DSM in some embodiments. As a result, PR-CP may be removed from the set of active permit records associated with S1 by the DSM in such embodiments. It is noted that at least in some embodiments, the logic implemented at the server nodes of the DSM may not be aware that the permit records and associated with the permit records are being used to implement semaphore semantics; rather, the client-side libraries may use the DSM servers' core capabilities (e.g., support for global timestamp generation, registry directories, locks and data objects, and the like) to implement the semaphore semantics. In one embodiment, for example, in which the DSM registry is organized as a hierarchy of directories or folders, each semaphore instance may be identified by a respective registry directory, as illustrated in FIG. 5, and each permit record may be identified by a lock on a path within the directory. In another embodiment (as illustrated in FIG. 6) each semaphore instance may be represented by a respective lock object within the registry, with the permit records being represented as entries in a requester queue for the lock object. In other embodiments, the server nodes of the DSM may implement semaphores as first-class objects, and as a result more of the work associated with semaphore management may be done on the DSM server side. For example, in such embodiments, the server itself may arrange the permit records in timestamp order, and may simply indicate to the client whether the permit has been granted or not, instead of letting the client arrange the permit records in timestamp order and determine whether the permit is granted.

Figure 3:
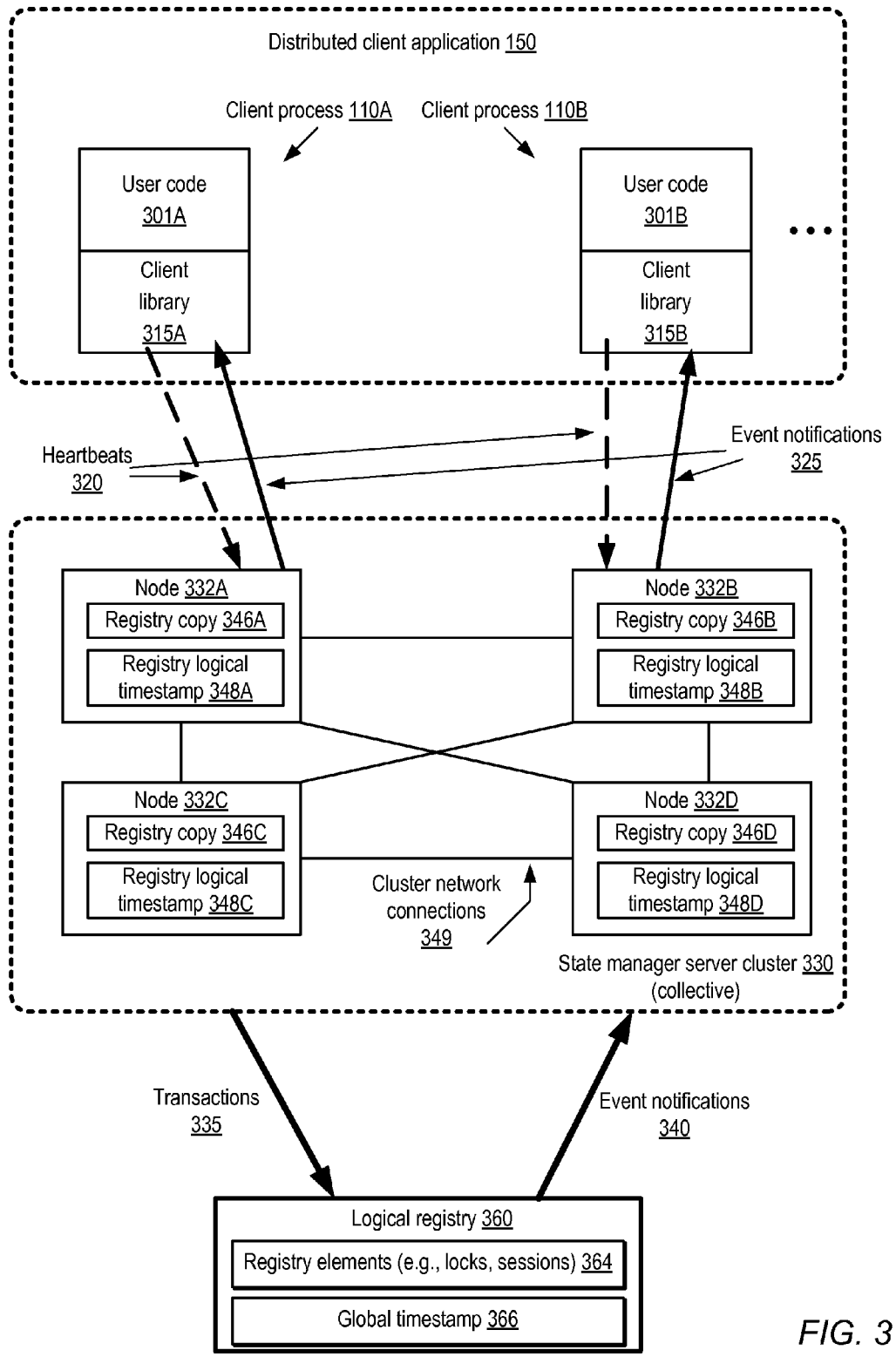
FIG. 3 illustrates various components of an example distributed state manager, according to at least some embodiments.

In at least some embodiments, the DSM may be configured to determine, using a heartbeat mechanism similar to that illustrated in FIG. 3, a health metric of a communication session established with a given client process. The health metric (e.g., how recently the last heartbeat message was received, or how many scheduled heartbeat messages in a row have not been received on time) may for example indicate whether the client process is up and running, or whether the client process is unhealthy or unresponsive (which may be the result of any of various factors such as overload, process exit, or network partitioning). If the communication session is in an unhealthy state, the DSM may, in some such embodiments, remove any permit records of the client process from the registry. This approach may help to ensure that dead or unreachable client processes do not consume semaphore permits indefinitely in such embodiments. In addition, in at least one embodiment, any other client processes waiting to be granted a permit to the semaphore may be automatically notified by the DSM regarding the removal of the permit record associated with the unhealthy session, thus potentially enabling some other client process to obtain access to the resource protected by the semaphore. In some embodiments, under certain conditions a given client process may be able to determine that its communication session with the DSM is in an unhealthy state. For example, in some implementations, a given client process may be configured not only to send heartbeat messages to the DSM, but also to receive heartbeat acknowledgments from the DSM. The heartbeat acknowledgments may, for example, confirm to the client process that the session is in a healthy state. If, in such an implementation, a session is disrupted due to network errors or network partitioning, while the client process itself remains up and running, the client process may be able to determine (e.g., due to the absence of at least some expected heartbeat acknowledgments from the DSM) that the session is in an unhealthy state. In at least one embodiment, when such a determination is made by the client process after it has obtained access to a resource protected by a semaphore instance, access to that resource protected may be deemed to be revoked (e.g., permits may only be considered to be granted as long as their corresponding sessions remain healthy). Accordingly, the client process in such embodiments may defer/delay/retry one or more operations directed to the resource, e.g., until a healthy session is restored and a new permit is granted. Similarly, any pending permit requests may have to be resubmitted after healthy communications have been reestablished in at least some embodiments.

In some embodiments, one or more client applications may wish to use the semaphore mechanism for enforcing mutual exclusion. In at least one such embodiment, the DSM may provide a programmatic interface enabling the creation of an instance of a binary semaphore for mutual exclusion using the same kinds of underlying primitives (e.g., registry directories or locks) as described above for counting semaphores. The permit limit for the semaphore may be set to one by the DSM in response to a creation request received via such an interface, without the client having to explicitly specify the permit limit.

Example System Environment

FIG. 1 illustrates an example distributed system environment, according to at least some embodiments. As shown, distributed system 100 may include a state manager 124 and a distributed client application 150. The state manager 124 and/or the distributed client application 150 may be implemented using a plurality of computing devices in some embodiments—for example, at least a portion of the state manager's functionality may be performed on one or more server nodes (e.g., the state manager may be implemented as a DSM), and at least some of the client processes may be instantiated on respective virtualized and/or physical compute resources. The state manager 124 may be configured to coordinate access to objects defined in one or more namespaces associated with respective distributed computing applications, including at least one namespace associated with distributed computing application 150. In some embodiments, a combined logical repository or registry may be used for all the namespaces.

The distributed client application may comprise a plurality of client processes 110, such as client processes 110A-110H, at least some which may wish to access a shared resource such as 140A or 140B. Shared resources 140A and 140B in the depicted embodiment may each be capable of supporting concurrent accesses from a plurality of client processes 110, so that the semantics of counting semaphores (rather than mutual exclusion locks) may be appropriate for protecting access to them. The client processes 110 may be provided programmatic access to the state manager 124 via a set of programmatic interfaces 160. In one embodiment, at least some of the programmatic interfaces may be accessed by client processes using a client component library that may be installable on the computing devices at which the client processes 110 run. The installable client component library may be referred to herein as a "client-side" component of the state manager, e.g., to distinguish it from one or more server nodes at which the registry and other components of the state manager are instantiated.

In the embodiment shown in FIG. 1, state manager 124 may be configured to implement a particular set of programmatic interfaces defining operations on a semaphore mechanism that can be used to protect accesses to shared objects 140. Such interfaces may allow a client process 110 to, for example, perform various semaphore interactions 165, such as requesting a creation of a new semaphore instance 116, requesting a permit on a specified instance 116, or releasing a specified instance 116, and so on. Instances 116A and 116B may have been created to protect shared resources 140A and 140B respectively. Internally at the state manager 124, each semaphore instance 116 may be represented using one or more permit records 120 in some embodiments (together with metadata such as a semaphore instance identifier or name and a permit limit). Permit records 120 may be stored as respective directory entries (such as locks) within a directory associated with the semaphore instance 116 in some embodiments, or as respective entries in a requester queue of a lock representing the semaphore instance 116 in other embodiments. Each permit record instance may, in the depicted embodiment, indicate that a corresponding permit request (e.g., a request to access the shared object 140) was received and processed by the state manager 124. Each permit record 120 may comprise a global timestamp (as indicated by the notation "TS" in FIG. 1) and an identification of which client process submitted the permit request (as indicated by the letter "C" in the permit records of FIG. 1). At a given point in time, corresponding to a given semaphore instance 116, some set of permits may have been granted (e.g., as indicated by granted permit records 120A for instance 116A and granted permit records 120C for instance 116B), while some set of permit records (e.g., 120B or 120D) may indicate that the corresponding client processes are waiting for a permit.

In the example illustrated in FIG. 1, permits to semaphore 116A have been granted to client processes 110B, 110D and 110E (as indicated by the permit records 120A, with respective global timestamps 112A, 112B, and 112C, where 112A represents an earlier (smaller) timestamp value than 112B, and 112B represents an earlier timestamp value than 112C). Because instance 116A has a permit limit of 3, the remaining permit records 120B represent waiting client processes (in this example, client processes 110A and 110C, with timestamps 112D and 112E that are higher than 112C). Similarly, instance 116B with a permit limit of 2 has two granted permit records (of client processes 110G and 110B), and one waiting permit record of client process 110E is shown as well. It is noted that although, for ease of explanation, the permit records are shown in sorted timestamp order in FIG. 1, the state manager 124 may not store the permit records in sorted order in at least some embodiments.

A client process 110 may submit, using one of the programmatic interfaces, a permit request to obtain access to a resource 140 protected by a semaphore instance 116. In response, in the depicted embodiment the client process may receive an indication of one or more permit records 120 (such as a list of permit records), including a particular permit record corresponding to the permit request that the client process submitted. For example, a representation of the five permit records shown for semaphore instance 116A may have been provided to client process 110C after its permit request was processed at timestamp 112E. The permit records may be provided in an unsorted or random order to the requesting client process in some implementations. In some embodiments the response to the client's permit request may also include an indication of the permit limit of the semaphore instance 116. Since each permit record contains a global timestamp TS generated by the state manager 124, indicative of an order in which permit requests to obtain access to the resource 140 protected by the instance 116 were processed by the state manager 124, the client process may be able to determine whether its permit has been granted or whether it is among the waiting client processes. In some embodiments, the state manager 124 may provide a list of permit records that is already sorted according to the global timestamps, thus simplifying the client's processing. If the client determines that a permit has been granted, the client may perform the desired operations on the shared resource 140. The permit may be released after the client process finishes its operations, e.g., by the invocation of another programmatic interface 160 by the client process 110.

Permit Record State Transitions

Figure 2:
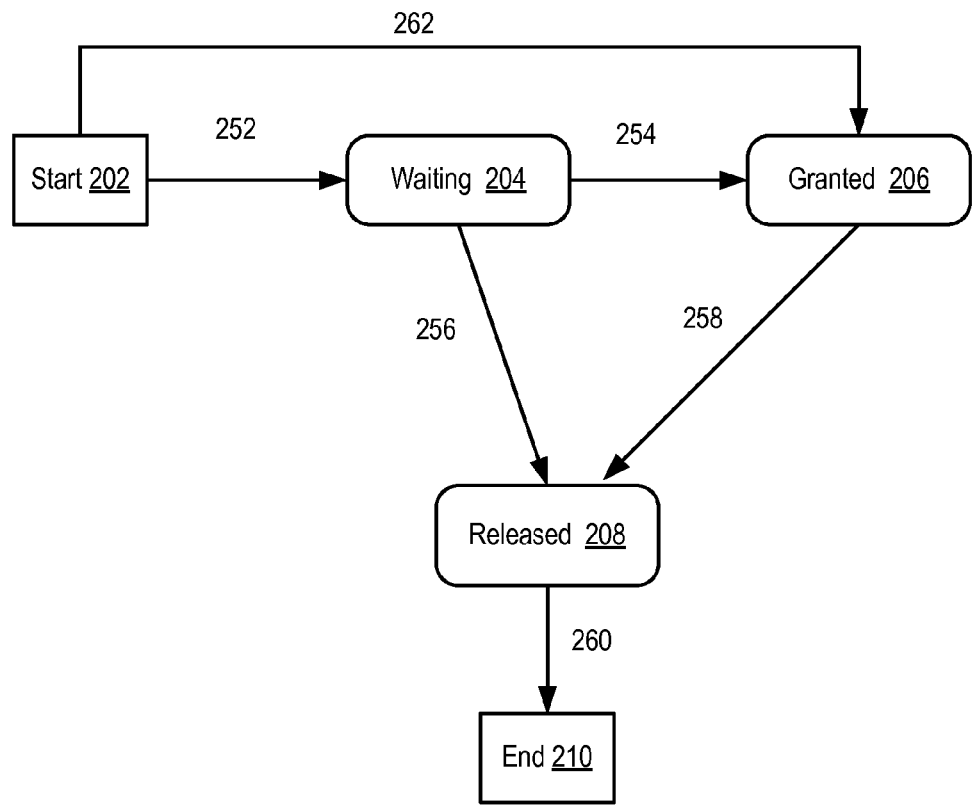
FIG. 2 illustrates an example of state transitions of a permit record associated with an instance of a semaphore mechanism, according to at least some embodiments.

FIG. 2 illustrates an example of state transitions of a permit record 120 associated with an instance 116 of a semaphore mechanism, according to at least some embodiments. The permit record may be created by the state manager 124 in such an embodiment in response to a received permit request from a client process 110, as indicated by the element 202 labeled "Start" in FIG. 2. A newly created permit record 120 may enter either a granted state 206 or a waiting state 204 in the depicted embodiment, depending on whether the permit limit for the instance 116 has already been reached or not. If the permit limit has not been reached, the granted state 206 may be attained immediately or very quickly, as indicated by transition 262; if the permit limit has been reached, transition 252 may lead to a waiting state, from which transition 254 may eventually lead to the granted state 206. In some implementations, even if the permit limit has not been reached when a permit request is received, the permit record may have to pass through a (brief) waiting state 204 before attaining the granted state 206.

In the depicted embodiment, the permit record may enter a released state 208 from either the waiting state 204 or from the granted state 206. A transition 256 from the waiting state to the released state may occur, for example, if the requesting client process 110 does not wish to remain waiting any longer and voluntarily issues a release request, or if the state manager 124 determines that the communication session with the client process 110 is in an unhealthy state. Transition 258 from the granted state may also occur for a variety of reasons, e.g., if the client process 110 completes its operations on the resource and voluntarily issues a release request, or the session health state is deemed unsatisfactory. At least in some embodiments, after the permit record is released, either voluntarily by the requesting client process 110 or as a result of a decision made by the state manager 124, the permit record may be deleted from the namespace in the state manager's registry (as indicated by the transition 260 to the element 210 labeled "End" in FIG. 2). In some implementations, a data structure being used for a permit record may include a field or associated metadata indicating the current state, while in other embodiments the state transitions may occur implicitly in response to invocations of programmatic interfaces such as APIs, and fields containing the state labels shown in FIG. 2 may not be stored.

Example Distributed State Manager Environment

As noted earlier, in at least some embodiments a distributed state manager with a plurality of server nodes may be used to implement aspects of the semaphore mechanism. FIG. 3 illustrates various components of an example distributed state manager (DSM), according to at least some embodiments. In the illustrated embodiment, the DSM comprises a server cluster 330 with a plurality of server nodes 332 (e.g., 332A, 332B, 332C and 332D), as well as client library components 315 (e.g., 315A and 315B). In the illustrated embodiment, a given client process, such as client process 110A of a distributed client application 150, may comprise an execution of user code 301A and client library components 315A. Similarly, client process 110B executes user code 301B and client library component 315B. Different client processes may execute different user code and/or library components in some embodiments. The client library component 315 of the DSM may in some embodiments comprise a software library that exposes one or more programmatic interfaces to user code 301 for interacting with the DSM server cluster 330. In various embodiments, user code 301 of a client process 110 may invoke various methods of the client library component 315 to interact with the DSM server cluster 330 over a network (e.g., to create semaphore instances, request permits, or release permits), access different constants and/or variables of client library components 315, and/or otherwise access data and functionality of the client library components 315. In some embodiments, the client library components may read data from the DSM, update data in the DSM, and/or listen for events notifications 325 from the DSM.

In some embodiments, each node 332 of the DSM server cluster 330 may be implemented using a different physical and/or virtual machine. In other embodiments, two or more of nodes 332 may be different software instances or processes executing on the same physical or virtual machine. The set of server nodes 332 may be referred to as a "collective" in some embodiments.

A given client process 110 may communicate with the collective via one of the nodes 332 in the depicted embodiment. Different client processes may communicate with different nodes in some embodiments. The particular node 332 chosen by a client process 110 may depend on the identity of the client, the type of request, and/or other factors. In some embodiments, a client process 110 may maintain affinity to a given node 332 once communication and/or another relationship has been established. It may also be possible for a client process 110 that has established affinity with a first node 332 of the DSM collective to switch to another node at any time. This may be done arbitrarily, in response to a node failure, in response to the node becoming overloaded, in response to a scheduler component indicating that the client should switch to another node, and/or in response to various other events. As shown in the illustrated embodiment, the various nodes 332 may communicate with one another via network connections 349. These network connections may be implemented using various types of networks (e.g., Myrinet, Ethernet, Gigabit Ethernet, etc.) in various topologies (e.g., ring, grid, Torus, bus, etc.).

For simplicity of explanation, many of the embodiments described herein comprise a DSM implemented on a fully-connected cluster of computers, where each node 332 is a different physical machine in the cluster, executes a separate instance of the DSM node software, and can communicate directly with every other node 332 in the collective via a network connection. However, those skilled in the art will appreciate that various other configurations are possible using different physical and/or virtual machines, connected by different network types and/or topologies, as described above.

According to FIG. 3, nodes 332 of the collective may work together to maintain a shared state, e.g., for various client applications, in a logical registry 360. The logical registry 360 may not necessarily be implemented as a separate physical entity, but rather, as a logical entity that may be implemented across multiple nodes 332 of the DSM. For example, in the depicted embodiment, each node 332 may keep a respective local copy 346 (e.g., local registry copy 346A for node 332A, local registry copy 346B for node 132B, and so on) of the logical registry 360. Through a consensus protocol, the nodes 332 may agree on state transitions for each node to apply to its local registry copy, thereby collectively maintaining a single logical registry 360. Each node 332 may thus maintain a cached copy of the registry that is valid as of the last registry transition (i.e., update) known at the node. In some embodiments, each transition may be associated with a registry logical timestamp, such as in a monotonically increasing 64-bit integer or counter agreed upon by the collective. This timestamp may be a physical or logical time in different embodiments, and may be referred to as the "DSM time" herein. In embodiments where the DSM time is maintained as a counter, it may be incremented each time the registry is updated in some implementations, e.g., each change to the logical registry may result in a change to the DSM time, and each change in the DSM time may indicate that at least one element of the registry was updated. Each node 332 may maintain its own registry logical timestamp 348 (e.g., logical timestamp 348A for node 332A, logical timestamp 348B for node 332B, and so on), indicative of the most recent transition of the logical registry that is reflected in the local registry copy at that node. At any point in time, in some implementations, the value of the local logical registry timestamp 348 at a given node 332 may differ from the value of the local logical registry timestamp of another node; however, if and when two nodes have the same local logical registry timestamp values, the data in their respective local registry copies 346 may be identical (i.e., both local copies of the registry may be guaranteed to have applied the same set of updates). In at least some implementations, each node 332 may also maintain an independent system clock separate from the registry logical timestamps.

Logical registry 360 may include information that may be accessed in a consistent manner by a plurality of the nodes 332. In some embodiments, the logical registry 360 may include several types of elements and associated metadata, such as permit records, lock objects, session objects representing connections to client processes 110, and the like. In some embodiments, the DSM may maintain multiple logical registries. In such embodiments, each logical registry may be identified by a unique name. Different logical registries may be used to store data relevant to a corresponding client application or set of client applications in some embodiments. For example, different distributed applications may use respective logical registries separate from one another. In other embodiments, a single logical registry may include elements representing state information of a plurality of client applications. In some embodiments, each of the elements of a given registry 360 (such as permit records, locks, other data entries, and/or sessions) may be identified by a respective pathname (e.g., "/companyA/departmentB/objectC" within a namespace, e.g., each element may be identified via a string concatenated from substrings, where each substring represents a respective hierarchical component named using a directory-like naming convention, starting with a root substring (e.g., "companyA" in the case of the element with the identifier "/companyA/departmentB/objectC").

In some embodiments, at least some entries within the logical registry may include a name, value, creation time, a modification time, and/or some other timestamp. The time-related information stored in the registry 360 (such as creation time, or modification time) may be expressed using DSM time in some embodiments, and/or using system clock time in other embodiments. For example, a global timestamp value 366 based on DSM time may be stored for or in a given permit record in at least some embodiments. The global timestamp value may indicate when the corresponding permit request was received at the collective in some implementations, or when the corresponding permit request was processed at the collective in other implementations. The time a permit request was processed may be somewhat later than the time the request was received, depending on various factors in different implementations and/or on how busy the node(s) 332 were when the request was received. In some embodiments, a logical registry may also list named client processes and/or client sessions (e.g., representations of connections between client processes 110 and the server cluster 330) recognized by the DSM. Such listings may also include configuration parameters for those client processes and/or sessions.

The DSM server cluster 330 may act as a mediator between the client processes 110 and one or more logical registries 360. The client process 110 may interact with a logical registry 360 by submitting transactions to the DSM server cluster 330, which may interact with the logical registry 360 on behalf of the client process. Through a read transaction, a client process may read information such as permit records, locks, entries, or sessions from the logical registry 360. Using a write transaction, a client process 110 may update information in the logical registry 360. In at least some embodiments, a permit request may be treated as a write transaction by the DSM, as it may lead to the creation and storage of a corresponding permit record in the logical registry, and the global timestamp 366 corresponding to the commit of the transaction may be saved in the permit record. Similarly, in some embodiments, a permit release operation may be treated as a write transaction, since it may typically involve removing a permit record from the logical registry.

Each transaction may have different possible outcomes. In some embodiments, these outcomes may correspond to success-write, success-read, abort, and fail. A success-write outcome may indicate that a transaction that includes at least one write operation was executed successfully and the registry has been updated. A success-read outcome may indicate that the transaction executed successfully but did not make any changes to the logical registry. An abort outcome may indicate that the transaction was aborted for some reason other than the particular contents of the transaction. In various embodiments, the DSM may abort and/or reattempt a transaction for different reasons. A fail outcome may indicate that the transaction failed, for example, because an object that was to be created already exists, the request contained a syntax error, and/or for various other reasons.

The DSM may determine the outcome of various transactions and route event notifications (e.g., as indicated by the arrows labeled 325 in FIG. 3) indicating the outcomes to interested client processes 110. Client processes 110 may register to receive some or all events in some events in some embodiments, e.g., using a transactional watch mechanism that may be implemented by the DSM. The transactional watch mechanism may allow a given client process to indicate a watch target comprising one or more objects within the registry, and to receive notifications whenever any of those objects is modified. In some implementations, a consistent cache mechanism may be implemented by the state manager (e.g., using the watch mechanism), enabling multiple client processes to maintain respective read-only caches that are updated by the state manager whenever a modification occurs to a cache data set comprising registry objects. In at least one embodiment, the watch mechanism and/or the cache mechanism may be used to implement counting semaphores—e.g., notifications regarding new or removed permit records (which may each correspond to transactions) may be sent to client processes using watch instances or cache instances. Internally, within the cluster 330, notifications 340 corresponding to the transaction outcomes may be sent to some or all of the server nodes 332. In some embodiments, the DSM may be configured to forward all event notifications to every client by default, but to allow each client to set up various filters to indicate the types of events in which it is interested. Each event notification 325 may be labeled with a physical and/or logical timestamp from which the client process 110 may be able to infer bounds on the age of the event in one embodiment.

As indicated above, in some embodiments client processes 110 may use transactions to read, insert, remove, and/or modify data stored in the logical registry 360. In some embodiments, a transaction may be specified using a stack-based language. Such a transaction may be specified in terms of data tokens and operations, where the data tokens are pushed directly onto a stack and the operations read their inputs from the stack and push results to the stack. After such a transaction is complete, the resulting stack may be sent to the client process.

In some embodiments, the DSM may execute a failure detection service to detect failures among different nodes 332. For example, if a given node 332 crashed or became otherwise unresponsive, the failure detection service may determine this. In some embodiments, a failure detection service may be executed across the server cluster 330 in a distributed manner. In one embodiment, the failure detection service may also determine whether particular client processes 110 have become unresponsive, for example, by monitoring heartbeat messages 320 received from various client processes. In at least some embodiments, if connectivity is lost between a client process 110 and a given DSM node, the client library component 315 of the client process may automatically attempt to establish a connection to a different node. In at least some implementations, the client process may not be aware of the identity of the node to which it is connected. In some embodiments, the DSM may respond to client heartbeat messages from a given client process with heartbeat acknowledgments, which may serve to inform the client process that the communication session with the DSM is in a healthy state. If a client process does not receive some number of heartbeat acknowledgements in a timely manner from the DSM in such an embodiment, the client process may deduce that the session is in an unhealthy state (and that the DSM is likely to have also concluded that the session is in an unhealthy state). In such a scenario, the client process may in some implementations conclude that any semaphore permits granted to the client process have been revoked, and may defer or delay operations on the resources protected by the semaphore(s) until a healthy communication session has been reestablished (and that any permits it was granted have been restored or re-acquired). In addition, in at least some embodiments, any waiting/pending permit requests may be resubmitted after a healthy communication session is restored.

Figure 4:
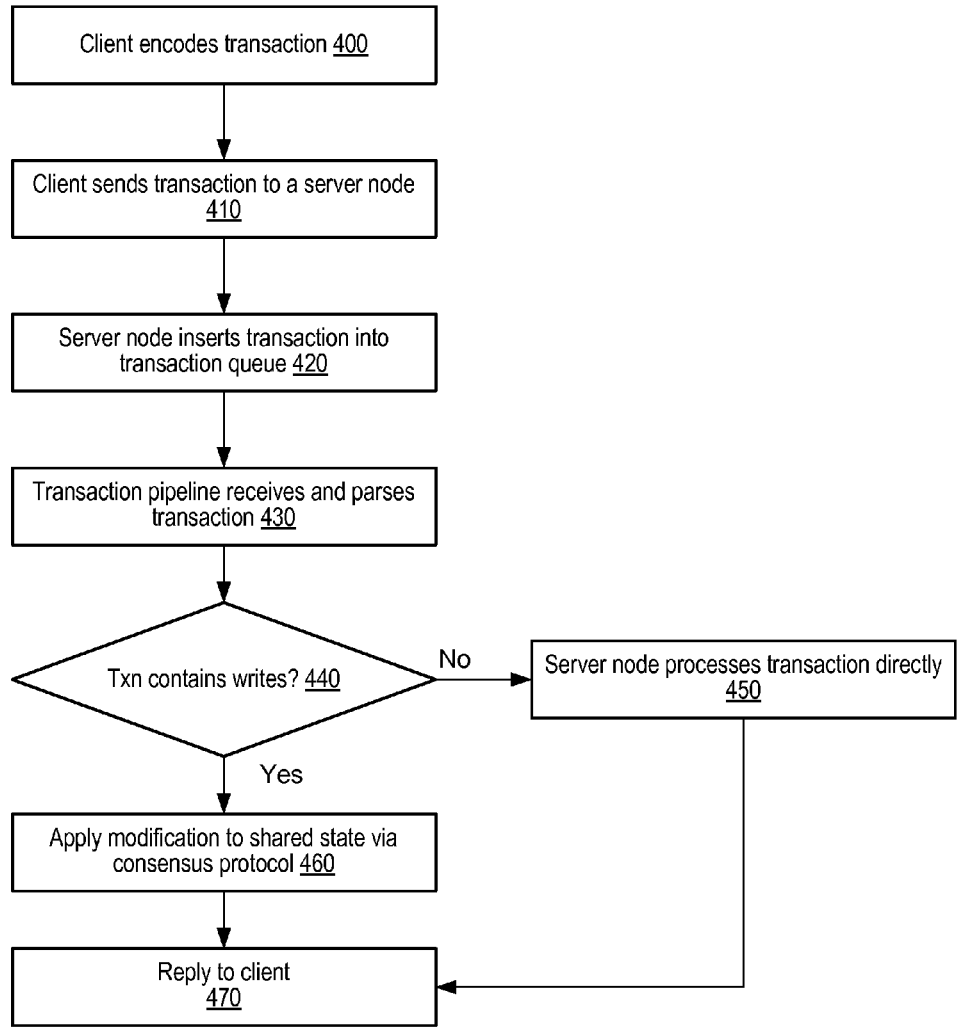
FIG. 4 is a flow diagram illustrating interactions between a client process and a distributed state manager collective to execute a transaction, according to at least some embodiments.

FIG. 4 is a flow diagram illustrating interactions between a client process 110 and a DSM collective 330 to execute a transaction, according to some embodiments. Such interactions may be initiated in one embodiment, for example, when a client process requests (e.g., using a client library component) that a new semaphore instance 116 be created, requests a permit on a semaphore instance 116, or requests a permit release on a semaphore instance 116. When a client process 110 determines to execute a given transaction, it may first encode the transaction, as indicated in element 400 of FIG. 4. Encoding the transaction may involve invoking one or more library functions of a client library component 315 in some embodiments. In one embodiment, the transaction may be encoded using a stack-based transaction language, as noted above. After creating the encoded transaction, the client process 110 may wrap the transaction in the body of a network message according to any suitable network protocol, and submit the wrapped transaction to a node 332 of the DSM server cluster 330, as shown in element 410. In some embodiments, the client process may contact any of a plurality of server cluster nodes 332 of the collective, e.g., in accordance with a node selection protocol.

Upon receiving the wrapped transaction, the node 332 may unwrap the message and insert the encoded transaction into a queue in a transaction pipeline, as shown in element 420. The pipeline may represent an ordered processing of transaction requests in some implementations. In some embodiments, several or all of the nodes 332 of a DSM collective may share the same transaction pipeline. The transaction pipeline may then receive and parse the encoded transaction, as shown in element 430. If the transaction does not contain any write operations to the logical registry (as indicated by the negative exit from element 440) then the DSM node 132 may process the transaction directly (as indicated in element 450) and reply to the client with a status message and/or any data requested (as shown in element 470).

If however, the transaction does contain write operations, as indicated by the affirmative exit from element 440, then the DSM may modify the logical registry 360. A transaction that includes writes may be referred to herein as a "modifying transaction". Examples of modifying transactions may include transactions corresponding to semaphore creation, permit requests and permit releases in some embodiments. Since multiple DSM nodes 332 collectively maintain the registry, the DSM node that received the transaction request may apply the writes by initiating a consensus protocol (e.g., Paxos) among these multiple nodes of the collective, as shown in element 460, before replying to the client with the result, as shown in element 470. The nodes involved in the collective decision as to whether to apply a write may be termed a "jury" herein. Many variations may be possible for executing write operations to the shared logical registry using consensus protocols. In some embodiments, the receiving node may first execute the transaction locally without applying the write operations to the logical registry and then, only after all writes of the transaction are known, apply the changes to the shared registry via a consensus protocol. For example, as the node 332 executes a transaction, the node may create a change request in addition to the normal stack. The change request may include a list of logical registry items read by the transaction execution (i.e., the read-set) and a list of writes to perform (i.e., the write-set). When the node finishes executing the transaction and the write-set is complete, then the modifications in the write-set may be made to the logical registry via a consensus protocol.

In some embodiments, performing the writes via a consensus protocol may include passing the completed change request to a predetermined one of the DSM nodes 332 (which may be termed a "primary" or "primus" node), directly or via a queue, for processing. For example, the primus may accept a completed change request and act as the leader in a Paxos protocol to reach consensus on committing the changes to the shared logical registry. In some embodiments, apart from its role in coordinating consensus protocol activities, the primus may be otherwise similar or identical to other nodes 332 of the DSM. In various embodiments, the primus may be selected from any of the nodes according to any suitable protocol, such as nomination or self-nomination, with or without election. If a primus fails during DSM operation, a new primus may be selected in some embodiments. In at least some embodiments, when a write transaction for a semaphore permit request commits, the global timestamp value 366 corresponding to the commit time may be recorded in the permit record corresponding to that permit request. The global timestamp may be incremented by the DSM each time any transaction commits, and as a result, in at least some embodiments, no two permit records may have the same global timestamp value.

Registry Contents for Semaphore Instances

As noted earlier, in at least some embodiments, a directory within a registry namespace may be created to represent an instance 116 of a semaphore mechanism. FIG. 5 illustrates example contents of such a registry directory associated with a semaphore instance, according to at least some embodiments. The registry as a whole may be organized as a collection of namespaces, with each namespace in turn comprising a plurality of directory entries in the depicted embodiment. To store state information associated with a particular customer on whose behalf one or more distributed client applications 150 may be run, a corresponding customer namespace root directory 524 may be established (e.g., with "customerC1" as the directory name and/or path). Within the customer namespace root directory 524, a semaphore root directory 526 (in this example, "customerC1/semaphores") may be created, to store information about semaphore instances associated with the customer's distributed client application(s).

The customer may use a plurality of semaphore instances, and a separate directory under the semaphore root directory may be created for each instance. In the depicted example, directory 528A with path "customerC1/semaphores/semA" represents one semaphore instance "A", and directory 528B with path "customerC1/semaphores/semB" represents a different semaphore instance "B". Metadata stored for the directory may indicate various properties of the semaphore instance, such as the permit limit.

Within a given semaphore instance's directory, respective objects (such as locks) may be set up to represent each permit record 502 (e.g., 502A, 502B, 502C, 502K and 502L) in the depicted embodiment. The specific type of object used for the permit records within the semaphore directory may vary in different implementations. For example, locks may be used in at least some embodiments because they are lightweight, commonly-used objects. Locks may be used for permit records even though there may not be any contention for any given permit record itself. The ownership of the lock being used as a permit record may be granted to the client process that requested the permit in at least some implementations. In some embodiments, objects other than locks (e.g., generic data objects, or ephemeral data entries or objects associated with the respective communication sessions established with client processes that submitted the permit requests) that have associated path names may be used for the permit records associated with the semaphore instances represented as directories. In at least some implementations, each path in the registry (whether it represents a lock or not) may implicitly represent a data object, and may have a global timestamp implicitly associated with it regardless of the type of the data object, indicating the last time the object was modified (or when it was created). Such a modification/creation timestamp may be used for ordering the permit records in some implementations.

In the embodiment shown in FIG. 5, each permit record 502 may have a corresponding pathname (e.g., "customerC1/semaphores/semA/54dfea413526" for permit record 502A) and a global timestamp value indicative of the time at which the corresponding permit request was received. In at least some implementations, the state manager may generate a unique string 530 for each permit record (e.g., the string "54dfea413526" for permit record 502A) so that each permit record has a unique path. The unique string may include encoding of one or more properties of the corresponding permit request, such as an identifier of the client process that requested the permit and/or an identifier of a communication session established between the client process and the state manager. In one implementation, a client process identifier and/or a session identifier may be stored separately (i.e., the path name may not include an indication of the client process or the session). The global timestamps may be used for sorting the permit records (e.g., in a client-side library component, or at a server component of the state manager) to determine which permits have been granted and which are still waiting. For example, in the depicted example, permits for the first two records 502A and 502B, with respective timestamps "5489748673" and "5489900023" have been granted, while the permit record 502C with a later timestamp "5512332100" represents a waiting client process (as indicated by the shaded background of permit record 502C).

The various entries shown in the "customerC1/semaphores" directory may have been generated by the state manager in response to respective client requests (e.g., client library component method calls) in the depicted embodiment. For example, a respective library method call to create a semaphore instance may have led to the creation of the "semA" directory and the "semB" directory, and respective permit requests from client processes 110 may have led to the creation of each of the permit records 502. In at least some embodiments, in response to a given permit request directed to a particular semaphore instance, the state manager may be configured to transmit a representation of the current set of permit records 502 (including the permit record newly created as a result of the permit request) for that semaphore instance back to the client library component. In such embodiments, the client library component may be responsible for using the information provided about the permit records to determine whether the client process has been granted the requested permit or not (e.g., by sorting the permit records in ascending timestamp order and checking whether the permit limit has already been reached).

In some embodiments, a separate directory may not be created for each semaphore instance; instead, other structures such as locks with respective requester queues may be used. FIG. 6 illustrates example lock objects that may be used to represent respective semaphore instances, according to at least some embodiments. As shown, a "customerC1/semaphores" directory 526 may be created under a customer root namespace directory 524 in such an embodiment, in a manner similar to that shown in FIG. 5. However, each semaphore instance may be represented by a respective lock object 602-lock 628A with path "customerC1/semaphores/semA-lock" for semaphore instance A, and lock 628B with path "customerC1/semaphores/semB-lock" for semaphore instance B. Each permit record 602 may be stored as a respective entry within a requester queue 604 for the corresponding lock. For example, semaphore instance A has three permit records (602A, 602B and 602C) in the requester queue 604A, while semaphore instance B has two permit records 602K and 602L in the requester queue 604B.

In the embodiment shown in FIG. 6, as in the case of the embodiment of FIG. 5 described above, the entries shown in the "customerC1/semaphores" directory may have been generated by the state manager in response to respective client requests (e.g., client library component method calls). For example, one library method call to create a semaphore instance may have led to the creation of the lock "semA-lock" and its requester queue 604A, while another call to create a semaphore instance led to the creation of "semB-lock" together with requester queues 604B. Respective permit requests from client processes 110 may have led to the creation of each of the permit records 602 in the requester queues. In at least some embodiments, in response to a given permit request directed to a particular semaphore instance, the state manager in the embodiment of FIG. 6 may transmit a representation of the permit records 602 of the requester queue 604 for that semaphore instance back to the client library component. The client library component may be responsible for using the information provided about the permit records 602 to determine whether the client process has been granted the requested permit or not (e.g., by sorting the permit records in ascending timestamp order and checking whether the permit limit has already been reached). In some embodiments in which locks are used to represent semaphore instances, up to N (the permit limit for the semaphore) client processes may be considered concurrent owners of the lock—e.g., the semantics of lock ownership may be modified from pure mutual exclusion to allow multiple owners. In other embodiments, the semantics of mutual exclusion for the ownership of the lock object at the server nodes of the state manager may be retained, but the contents of the requester queue (and their respective global timestamps) may be used at the client library to implement counting semaphore semantics.

It is noted that in different embodiments, registry entries related to semaphore mechanisms may be organized in a manner different than the organizations indicated in FIG. 5 and FIG. 6. For example, in some embodiments, the namespaces may not be organized with different root directories for each customer; instead, for example, a common semaphores directory may be created for semaphore instances of various customers. In at least one embodiment, other data structures such as hash tables may be used to organize registry entries, e.g., instead of using a directory-oriented hierarchy.

Methods for Implementing Semaphores

Figure 7:
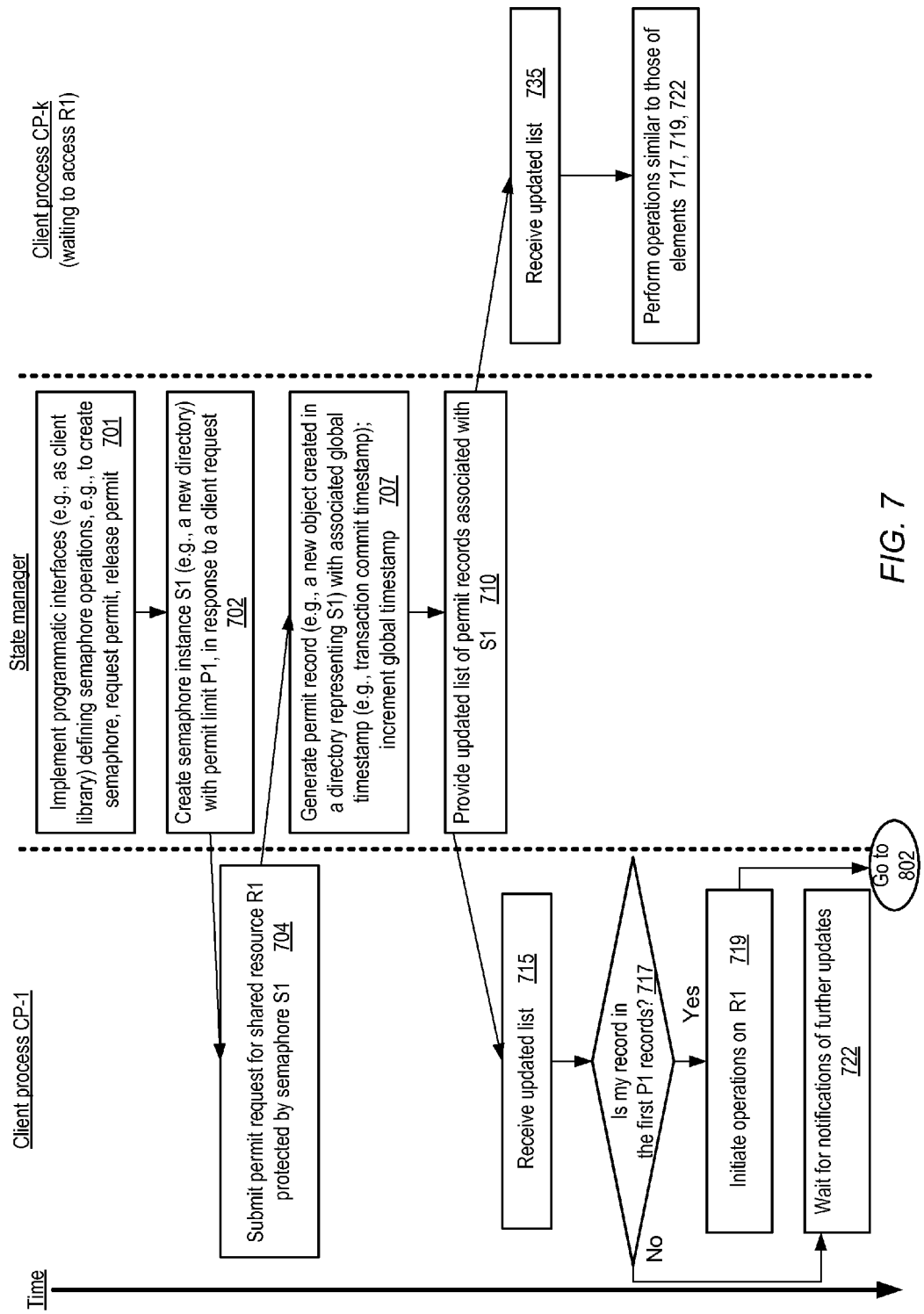
FIG. 7 is a flow diagram illustrating aspects of operations that may be performed to enable a client process to acquire a permit on a semaphore instance, according to at least some embodiments.

FIG. 7 is a flow diagram illustrating aspects of operations that may be performed to enable a client process to acquire a permit on a semaphore instance, according to at least some embodiments. In FIG. 7, operations performed at or by two client processes CP-1 and CP-k, as well as at the server(s) of state manager 124, are shown in respective columns, as indicated by the column labels at the top of FIG. 7. As shown in element 701, the state manager may implement a number of semaphore-related programmatic interfaces (e.g., APIs), such as interfaces to create a semaphore instance, request/acquire a permit, and release a permit. A representation of a new instance S1 of a counting semaphore with a permit limit P1 may be created in response to a request received via one of the programmatic interfaces (element 702)—for example, a new directory similar to directory 528A of FIG. 5 may be created in the registry. In some embodiments, a client process "CP-init" responsible for initializing aspects of the distributed application 150 may submit the request to create the semaphore, for example. The programmatic interfaces may be provided in the form of a client library in at least some embodiments, and at least some of the processing related to semaphore acquisition and/or release may be performed by components of the client library in such embodiments.

As shown in element 704, client process CP-1 may submit a permit request to access a shared resource R1 protected by semaphore instance S1. (As noted earlier, at least in some embodiments, the protection provided by the semaphore mechanism may be advisory in nature, in that the client processes may be expected to voluntarily comply with the semaphore semantics.) In response to the permit request, a new permit record may be created (e.g., similar to permit records 502 of FIG. 5) in the registry by the state manager, with an associated global timestamp value, as shown in element 707. In some embodiments, permit records may be implemented using lock primitives supported by the state manager, while in other embodiments other data objects or entries (e.g., data entries associated with client communication sessions) may be used. The global timestamp for the permit record may, for example, represent a commit timestamp for a write transaction associated with the permit record's creation. The global timestamp may be incremented or modified, such that no other permit record may share the same timestamp value. In embodiments in which a distributed state manager of the type illustrated in FIG. 2 is used, the DSM's global timestamp 366 may be used. In some embodiments, mechanisms other than global timestamps, such as sequence numbers, may be used.

In at least some embodiments, when the state of the semaphore instance S1 changes, e.g., when a new permit record is created or an existing permit record is removed, interested parties such as client processes that wish to access (or are already accessing) the resource R1 protected by the semaphore may be notified automatically. In some such embodiments, as mentioned above, the state manager may implement a transactional "watch" mechanism, according to which one or more client processes may indicate registry elements of interest to them, and be notified whenever the state of those elements changes, thus avoiding the need to poll the state manager to determine if any of the elements changes. In one embodiment, a consistent read-only cache mechanism may be implemented (e.g., using the watch mechanism) by the state manager, enabling clients to read registry contents from a consistent, automatically and efficiently updated client-side cache whenever registry elements of interest are modified. According to at least one embodiment, some client library components may use the watch mechanism and/or the read-only cache mechanism to support semaphore-related functions—e.g., a client-side cache for elements of the directory established at the state manager may be set up, and/or a watch may be established for the permit records associated with S1.

In the embodiment depicted in FIG. 7, when the new permit record is generated (element 710), an updated list of the permit records may be provided to client process CP-1, a different client process CP-k, and any other client processes that may be waiting to access R1 using semaphore S1 (element 710). Such a notification may be provided in some embodiments using instances of the cache mechanism or the watch mechanism described above. In some embodiments, in addition to the requester CP-1 and any waiting client processes, client processes that currently have permits (and therefore may be accessing R1) may also be notified regarding the updates list.

When CP-1 receives the updated list of permit records with their global timestamps (element 715), in the embodiment illustrated in FIG. 7, CP-1 may determine whether its permit record is in the first P1 records if the permit records are arranged in increasing timestamp order (element 717). In at least some embodiments, this determination may be performed by a client library component. In such embodiments, the user code 301 of the client process may not have to examine the permit records; instead, the user code portion of the client application may simply wait until the permit is granted, while the determination of whether the permit is granted, and/or the waiting for the permit to be granted, may be performed by the client library component. If a determination is made that the permit is granted (e.g., that CP-1's permit record is among the first P1 in the timestamp-ordered list), CP-1 may initiate desired operations on R1 (element 719). Otherwise, CP-1 may wait for further updates from the state manager (element 722), e.g., in the form of asynchronous update notifications.

Similarly, in the depicted embodiment client process CP-k may receive the updated list (element 735), and proceed to perform operations similar to those of elements 717, 719, and 722. For example, CP-k may check whether its permit record is in the first P1 permit records in a timestamp-ordered list of the current set of permit records, and if so, it may initiate its own operations on R1. If it is not in the first P1, CP-k may await further updates. In at least some implementations, notifications of updated permit records may be received by client processes (e.g., in operations corresponding to elements 715 and 722 using constructs similar to those implementable using the Java™ Future interface.

Figure 8:
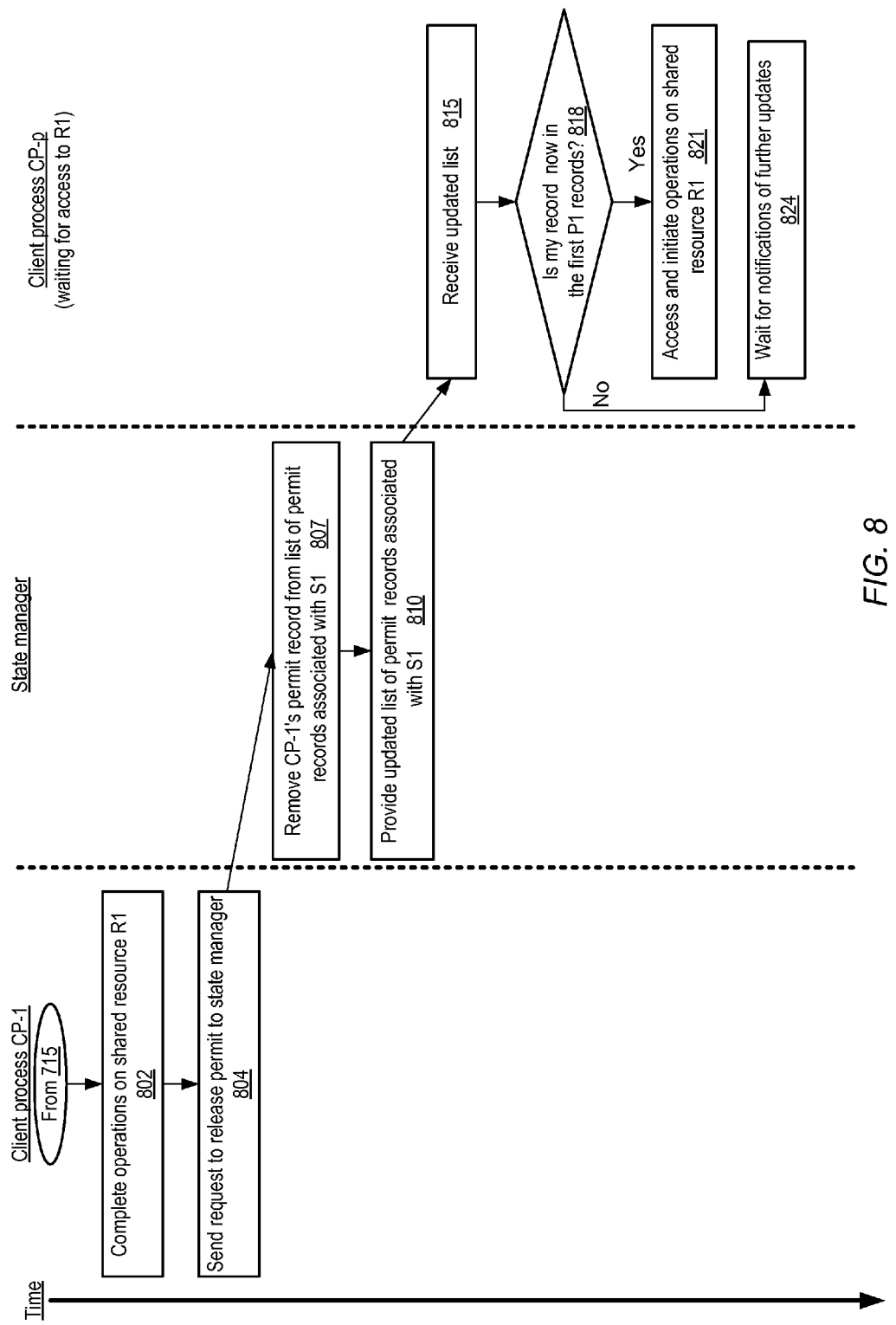
FIG. 8 is a flow diagram illustrating aspects of operations related to releasing a permit on a semaphore instance, according to at least some embodiments.

As indicated by the element labeled "Go to 802" in FIG. 7, if CP-1 is granted a permit, operations represented in FIG. 8 starting at element 802 may ensue. FIG. 8 is a flow diagram illustrating aspects of operations related to releasing a permit on a semaphore instance, according to at least some embodiments. As shown in element 802 of FIG. 8, client process CP-1 may complete its operations on the shared resource R1. After completing the operations, CP-1 may send a request to release its permit to the state manager.

In response to receiving the release request, the state manager may remove CP-1's permit record from the list of permit records associated with S1 in the depicted embodiment (element 807). Once again, an updated list of the permit records of S1 may be sent to interested client processes such as CP-k (element 810) (e.g., using a cache mechanism and/or a watch mechanism). Upon receiving the updated list (element 815), client process CP-k may again check whether its permit has been granted, e.g., by determining whether its permit record is now in the first P1 records in a timestamp-ordered list of the updated permit records (element 818). If CP-k is granted the permit, it may initiate its operations on shared resource R1 (element 821); otherwise CP-k may resume waiting for asynchronous notifications of further updates (element 824). It is noted that while waiting for updates (e.g., in operations corresponding to elements 722 and/or 824), the client processes may perform other work in at least some embodiments; e.g., the client processes need not necessarily block while they wait.

Figure 9:
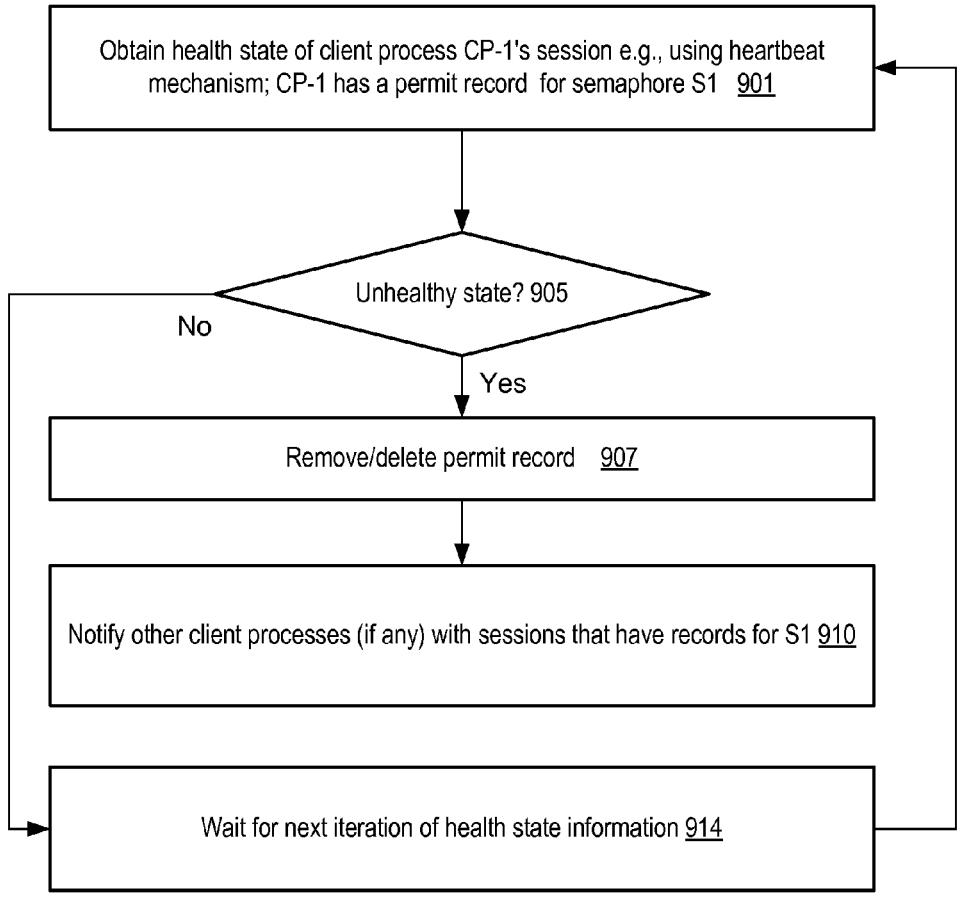
FIG. 9 is a flow diagram illustrating aspects of operations that may be performed in response to determining that a communication session between a client process and a state manager is in an unhealthy state, according to at least some embodiments.

As described earlier, in at least some embodiments, the state manager 124 may be configured to monitor the health state of client processes 150. Health status of client processes may be obtained using any of several different techniques in different embodiments, including for example periodic heartbeat messages (similar to heartbeat messages 320 shown in FIG. 3) sent during a client process' communication session with the state manager. FIG. 9 is a flow diagram illustrating aspects of operations that may be performed in response to determining that a communication session between a client process and a state manager is in an unhealthy state, according to at least some embodiments. As shown in element 901, the state manager may obtain an indication of the health state of a session established with a client process CP-1 that has a permit record associated with a semaphore S1. If the session is determined to be in an unhealthy state (e.g., if some threshold number of consecutive heartbeat messages are not received within a time period), as determined in element 905, the permit record may be removed/deleted from the registry by the state manager (element 907). Such a removal may trigger a notification to other client processes with permit records on S1 (element 910), e.g., using a watch mechanism, a cache mechanism, or a different update mechanism implemented by the state manager. If the session is not in an unhealthy state (as also determined in element 905), the state manager may wait for the next iteration of health state information (element 914). The removal of permit records for client processes with whom communication is problematic may help avoid situations in which semaphore permits are never given up (e.g., if a client process terminates while holding a granted permit). The criteria for determining whether a session is in an unhealthy state may differ in various implementations—e.g., in some embodiments in which a heartbeat message is expected from each client process every T seconds, five missed heartbeats may be used as the criteria, while in other implementations, longer period of inactivity and/or unresponsiveness may be used to define unhealthy states. As noted earlier, in some embodiments, a given client process may be able to determine whether its communication session with the state manager is in an unhealthy state (e.g., if heartbeat acknowledgements or other session health indicators are not received in a timely manner from the state manager). In some such embodiments, if, after a client process is granted a permit, the client process is able to determine that its session has reached an unhealthy state, the client process may defer or delay any operations on the resource protected by the corresponding semaphore (e.g., until a healthy session is restored and/or the permit is re-granted). Thus, a determination of an unhealthy session by either the state manager or the client process (or both) may result in such embodiments in corresponding actions associated with a revocation of semaphore permits granted in the session. In addition, in some such embodiments, the client process may be responsible for resubmitting any permit requests that were in waiting state when the session became unhealthy.

Figure 10:
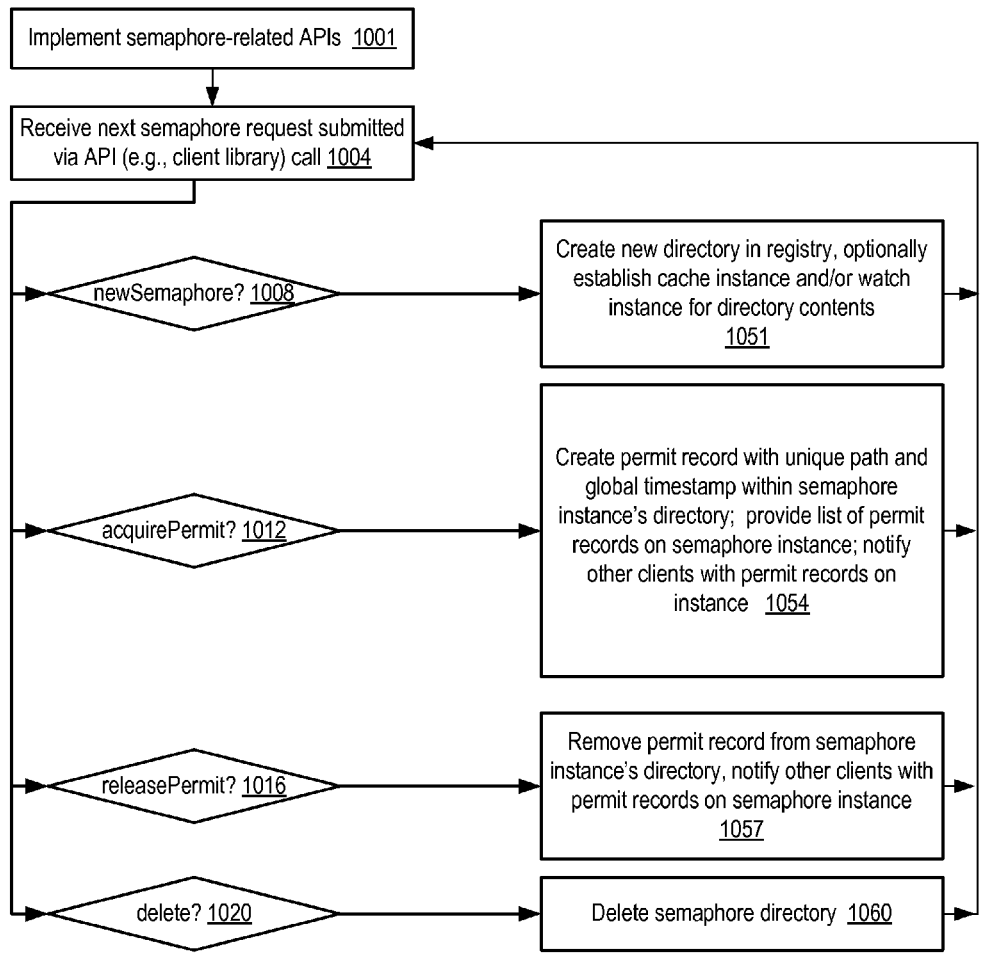
FIG. 10 is a flow diagram illustrating aspects of operations that may be performed in response to invocations of example methods of a semaphore-related client library, according to at least some embodiments.

A number of semaphore-related APIs may be provided by the state manager in some embodiments, e.g., via a client library. FIG. 10 is a flow diagram illustrating aspects of operations that may be performed in response to invocations of example methods of a semaphore-related client library, according to at least some embodiments. As shown in element 1001 of FIG. 10, a collection of semaphore-related APIs may be implemented. The next semaphore-related call may be received, e.g., at the client library from user code of the client process (element 1004). In the depicted embodiment, at least four API methods may be supported, and different sets of operations as shown in FIG. 10 may be implemented for each of the methods.

If the API method invoked is "newSemaphore", as detected in element 1008, a representation of a new semaphore instance may be created in the registry by the state manager. As shown in element 1051, a new directory 528 may be created for the semaphore in some embodiments; in other embodiments a lock 628 may be created for the instance. In some implementations, the "newSemaphore" method may include parameters such as the session or connection identifying the client requesting the semaphore instance, the registry path (e.g., directory path) to be used for the instance, and/or the permit limit. In some embodiments, the creation of the directory or lock representing the semaphore instance may be accompanied by the creation of an instance of a cache mechanism, or a watch, e.g., to enable efficient update notifications to client processes interested in the newly created semaphore instance.

In the depicted embodiment, the "acquirePermit" method may be used to request a permit, and/or to request a notification when the permit is granted. If the "acquirePermit" method is invoked, as detected in element 1012, and the directory-oriented semaphore implementation illustrated in FIG. 5 is being used, a permit record may be created as an entry (e.g., a lock) in the semaphore directory (element 1054). In at least some embodiments, a unique string may be generated to be used for the path (within the directory) of the permit record. A list of the permit records on the semaphore instance may be provided to the client process that invoked "acquirePermit", and other processes with permit records on the semaphore may be notified (e.g., using a cache or watch mechanism). In at least some implementations, the user code of the client process may be provided a reference to an asynchronous notification mechanism (similar in concept to a Java™ Future interface instance), on which the user code may invoke a wait( ) or get( ) operation to be notified when the permit is granted. An example of the use of such notification mechanisms is provided below in PseudoCode Example 1.

If the "releasePermit" method is invoked on a granted permit (as determined in element 1012), the permit record may be removed from the directory (element 1057) and other client processes may be informed about the removal. If a "delete" method is invoked on the semaphore instance, and the requesting client has the required permission, the semaphore directory may be deleted in some embodiments. In one embodiment, if a "delete" is invoked while there are still permit records on the semaphore, the deletion may be rejected or delayed until all the permit records have been released. In at least some embodiments, idempotent implementations of the "releasePermit" and/or "delete" methods may be provided. E.g., if an idempotent version of "releasePermit" were invoked twice in succession by a given client process, only one of the invocations would have an effect, and the other may be ignored without returning an error message. Similarly, invoking an idempotent "delete" N times would result in at most one actual deletion, and no error messages. In embodiments where non-idempotent versions of these methods were implemented, error messages may be returned if "delete" is invoked more than once on the same instance or if "releasePermit" is invoked twice on the same permit. After completing the requested operations corresponding to any of the supported methods, the state manager may be configured to wait to receive the next semaphore-related method invocation (element 104). In at least some embodiments, additional methods and/or interfaces may be implemented—e.g., an interface to create a mutual exclusion mechanism using a counting semaphore with an implicit permit limit of one (e.g., a binary semaphore implemented using the counting semaphore mechanism) may be provided in some embodiments. In such an embodiment, the equivalent of a "newMutexUsingSemaphore" method may be supported, for which the client may not need to specify a permit limit since the only allowed value for the permit limit for mutual exclusion is one.

It is noted that in various embodiments, the operations illustrated in the flow diagrams of FIG. 7, 8, 9 or 10 may be performed in a different order than that shown, or may be performed in parallel. In some embodiments some of the operations illustrated in FIG. 7-FIG. 10 may be omitted.

PseudoCode Example 1 shows a pseudo-code sequence, in a Java™-like language, of invocations of methods of a state manager's client library supporting counting semaphores, according to at least one embodiment. In the illustrated embodiment, several of the objects returned from the method invocations (e.g., newSemaphore( ), acquirePermit( ) and releasePermit( )) may have semantics similar to instances of Java™ Future, in that, for example, the get( ) method may be used on the returned objects to wait for a notification of completion of a corresponding asynchronous computation. In other embodiments, mechanisms with other semantics may be employed. Within the client library code, client-side cache mechanisms and/or watch mechanisms may be used. It is noted that although the pseudo-code shown is for a single client process, portions of the pseudo-code may be executed concurrently by different client processes in various embodiments.

PseudoCode Example 1

1. // request to create new semaphore instance
2. CountingSemaphore semaphore =
    CountingSemaphore.newSemaphore(connection, path, n).get( );
3. // request permit and wait until it is granted
4. Permit permit = semaphore.acquirePermit( ).get( );

PseudoCode Example 1

```
 5.  try {
 6.     // resource protected by semaphore is available; do the work
 7.     doWork( );
 8.  } finally {
 9.     semaphore.releasePermit (permit).get( );
10.  }
11.  // close/delete semaphore
12.  semaphore.delete( );
```

As indicated in comment line 1, the newSemaphore( ) method of lines 2 and 3 may be invoked to create a new semaphore instance. The "connection" parameter may identify the client's connection or communication session; the "path" parameter may indicate the pathname of the directory to be created for the semaphore instance, and "n" may indicate the permit limit in the illustrated embodiment. The "get( )" method on the result of the newSemaphore( ) method may indicate that the requesting client process is to be notified when the new semaphore instance is successfully created. Since the directory creation may involve a consensus protocol in at least some embodiments among a collection of state manager nodes, it may take some time to create the directory, and the requesting client may wait for the completion of the asynchronous directory creation operation using the "get( )" method.

As indicated by the comment in line 3, a permit request may be submitted using the "acquirePermit( )" method of line 4, and the corresponding get( ) may be used to receive a notification when the permit is actually granted. That is, in the depicted embodiment, the work of receiving the list of permit records, and the waiting until the requester's permit record is eventually granted, may all be performed in response to the single line of code that includes "acquirePermit( ).get( )".

After the permit is granted, code corresponding to the try block of lines 5-8 may be used to perform the operations on the object protected by the semaphore instance, as indicated in the comments of line 6. After the work is completed (or if an error occurs), the permit obtained in line 4 may be released using the "releasePermit( ).get( )" operations of line 9. As in lines 2 and 4, the get( ) method may be used in line 9 because the corresponding release operations (e.g., the deletion of a permit record by the state manager) may involve a consensus-based commit, so the client process wishing to release the permit may indicate that an asynchronous notification should be provided when the release completes. The semaphore may be deleted using the delete( ) call of line 12.

It is noted that while Java™-like syntax is used for the pseudo-code shown in the example, any appropriate programming language, with or without asynchronous notification mechanisms similar to Java™'s Futures, may be used in various embodiments to implement the counting semaphores mechanism.

Use Cases

The techniques described above, of providing support for counting semaphore mechanisms using state manager primitives such as directories, global timestamps, and mutex locks, may be useful in any distributed computing environment in which multiple client processes are to share access to a resource. For example, various types of applications involving work queues may wish to have more than one worker process operate on a shared queue of tasks. In addition, load balancing and auto-scaling services that may wish to allow a certain number of nodes to be active at a time for a particular client may also be able to benefit from counting semaphores.

Illustrative Computer System

Figure 11:
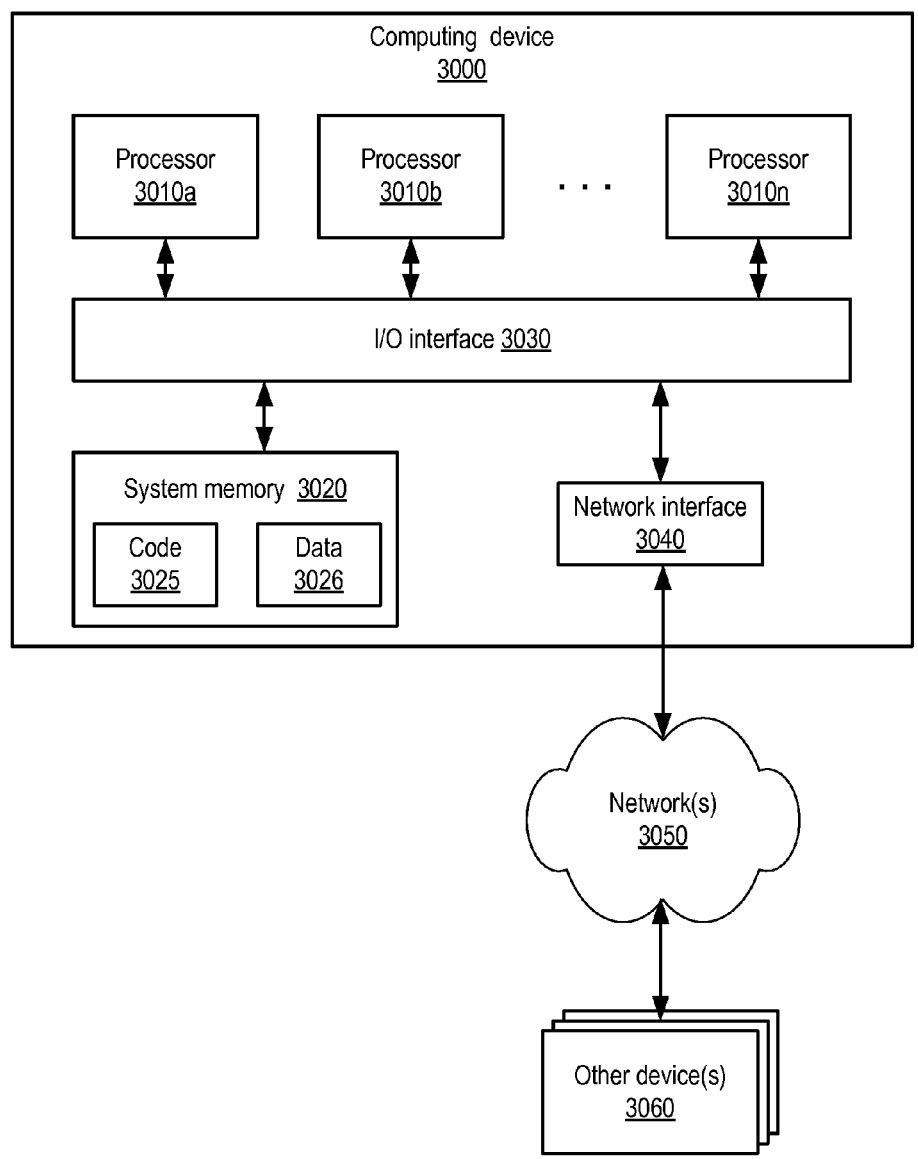
FIG. 11 is a block diagram illustrating an example computing device that may be used in at least some embodiments.

In at least some embodiments, a server that implements a portion or all of one or more of the technologies described herein, including the techniques for either the server-side or client-side components of state managers as well as distributed client processes, may include a general-purpose computer system that includes or is configured to access one or more computer-accessible media. FIG. 11 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 10, including various devices serving as entropy sources, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A distributed system, comprising a plurality of computing devices configured to implement:
    a distributed application including a plurality of client processes; and
    a state manager accessible to the distributed application, wherein the state manager comprises a plurality of server nodes configured to coordinate access to a set of objects defined in a namespace associated with the distributed application;
wherein the state manager is configured to:
    implement a set of programmatic interfaces, accessible to the plurality of client processes, defining operations on a semaphore mechanism, wherein an instance of the semaphore mechanism is identified by an object in the namespace;
and wherein a particular client process of the plurality of client processes is configured to:
    submit, to the state manager via a programmatic interface of the set, a permit request to obtain access to a resource protected by an instance of the semaphore mechanism;
    receive, in response to the permit request, an indication of one or more permit records, including a particular permit record corresponding to the permit request, wherein each permit record of the one or more permit records comprises a global timestamp generated by the state manager indicative of an order in which one or more permit requests to obtain access to the resource were processed by the state manager;
    determine, based at least in part on the indication of the one or more permit records, whether the particular client process is granted access to the resource; and
    in response to a determination that the particular client process is granted access to the resource, perform one or more operations associated with the resource.

2. The distributed system as recited in claim 1, wherein the state manager is configured to provide a client-side component library for use by the plurality of client processes, wherein the particular client process is configured to invoke an operation defined in the client-side component library to determine whether the particular client process is granted access to the resource.

3. The distributed system as recited in claim 1, wherein the instance of the semaphore mechanism has an associated permit limit indicating the maximum number of client processes permitted to access the resource concurrently, and wherein, to determine whether the particular client process is granted access to the resource, the particular client process is configured to:
    determine the number of permit records that are ahead of the particular permit record within an ordering of the one or more permit records based on increasing global timestamps; and
    in response to a determination that the number of permit records is less than the permit limit, determine that the particular client process is granted access to the resource.

4. The distributed system as recited in claim 1, wherein the instance of the semaphore mechanism is identified by a directory within the namespace, wherein the particular permit record is represented by the state manager as a lock on an object path within the directory, and wherein a different permit record associated with a different permit request to access the resource from a different client process of the plurality of client processes is represented by the state manager as a lock on a different object path within the directory.

5. The distributed system as recited in claim 1, wherein the instance of the semaphore mechanism is identified by a lock on a path within the namespace, wherein the particular permit record is represented by the state manager as an entry in a requester queue associated with the lock, and wherein a permit record corresponding to a different permit request to access the resource from a different client process of the plurality of client processes is represented by the state manager as another entry in the requester queue.

6. The distributed system as recited in claim 1, wherein the state manager is configured to:
determine, using a heartbeat mechanism, a health metric of a communication session established with the particular client process; and
in response to a determination that the health metric indicates an unhealthy state of the communication session,
remove the particular permit record from the namespace; and
provide, to a different client process of the plurality of client processes that is awaiting access to the resource, an indication of the removal of the particular permit record.

7. A method, comprising:
submitting, by a particular client process of a distributed application comprising a plurality of client processes, to a state manager accessible to the plurality of client processes via a programmatic interface, a permit request to obtain access to a resource protected by an instance of a semaphore mechanism, wherein the state manager comprises a plurality of server nodes configured to coordinate access to a set of objects associated with the distributed application;
receiving, by the particular client process in response to the permit request, a representation of one or more permit records associated with the resource, including a particular permit record associated with the permit request, wherein the one or more permit records provide an indication of a sequence in which one or more permit requests were processed;
determining, by the particular client process, based at least in part on the one or more permit records, whether the particular client process is granted access to the resource; and
performing, by the particular client process, in response to a determination that the particular client process is granted access to the resource, one or more operations associated with the resource.

8. The method as recited in claim 7, wherein said programmatic interface comprises an operation defined in a client-side component library provided by the state manager.

9. The method as recited in claim 8, wherein said determining whether the particular client process is granted access to the resource comprises invoking another operation defined in a client-side component library provided by the state manager.

10. The method as recited in claim 7, wherein the instance of the semaphore mechanism has an associated permit limit indicating the maximum number of client processes permitted to access the resource concurrently, and wherein said determining whether the particular client process is granted access to the resource comprises:
determining, by the particular client process, the number of permit records that are ahead of the particular permit record within an ordering of the one or more permit records based on the sequence; and in response to a determination that the number of permit records is less than the permit limit, determining by the particular client process that the particular client process is granted access to the resource.

11. The method as recited in claim 7, further comprising:
representing the instance of the semaphore mechanism as a directory within a namespace associated with the distributed application;
representing the particular permit record as a lock on an object path within the directory; and
representing, as a lock on a different object path within the directory, a permit record corresponding to a different permit request to obtain access the resource from a different client process of the plurality of client processes.

12. The method as recited in claim 11, further comprising:
generating, by the state manager, in response to the permit request from the particular client process, a unique random string; and
using, by the state manager, at least a portion of the unique random string as at least a portion of the object path within the directory.

13. The method as recited in claim 7, further comprising:
representing the instance of the semaphore mechanism as a directory within a namespace associated with the distributed application;
representing the particular permit record within the directory as an entry associated with a communication session of the particular client process; and
representing, as a different entry associated with a different communication session within the directory, a permit record corresponding to a different permit request to obtain access the resource from a different client process of the plurality of client processes.

14. The method as recited in claim 7, further comprising:
representing the instance of the semaphore mechanism as a lock on an object within a namespace associated with the distributed application;
representing the particular permit record as an entry in a requester queue associated with the lock; and
representing a different permit record corresponding to a different permit request to obtain access to the resource as another entry in the requester queue.

15. The method as recited in claim 7, further comprising:
establishing, prior to said submitting, a communication session between the particular client process and the state manager, wherein the state manager is configured to monitor a health metric of the communication session established with the particular client process, wherein said submitting is performed as part of the communication session; and
in response to determining, by the state manager, that the health metric indicates an unhealthy state of the communication session,
removing, by the state manager, the particular permit record from a namespace associated with the distributed application; and
receiving, by a different client process of the plurality of client processes that is awaiting access to the resource, an indication of the removal of the particular record from the namespace.

16. The method as recited in claim 15, further comprising:
determining, by the particular client process, that (a) the communication session is in an unhealthy state and (b) access to the resource is to be revoked as a result of the communication session's unhealthy state; and deferring, by the particular client process, at least one operation associated with the resource in response to determining the communication session's unhealthy state.

17. The method as recited in claim 7, further comprising:
requesting, by the particular client process after completing the one or more operations, a removal of the particular permit record from a namespace associated with the distributed application;
removing, by the state manager in response to said requesting the removal, the particular permit record from the namespace; and
receiving, by a different client process of the plurality of client processes that is awaiting access to the resource, an indication of the removal of the particular permit record.

18. The method as recited in claim 7, further comprising:
submitting, by a different client process of the plurality of client processes to the state manager via a particular programmatic interface defined by the state manager, a request to create a different instance of the semaphore mechanism to protect access to another resource, wherein the request to create the different instance includes respective parameters indicating (a) an identifier to be associated with the different instance and (b) a maximum number of client processes to be allowed concurrent access to the other resource; and
generating, by the state manager in response to the request to create the different instance, an additional object within a namespace associated with the distributed application.

19. A non-transitory computer-accessible storage medium storing program instructions that when executed on one or more processors implement a state manager accessible to a plurality of client processes of a distributed application, wherein the state manager is configured to:
implement a set of programmatic interfaces defining operations on a semaphore mechanism;
receive, from a particular client process of the plurality of client processes via a programmatic interface of the set, a permit request to obtain access to a resource protected by the instance of the semaphore mechanism; and
transmit to the particular client, in response to the permit request, a representation of one or more permit records, including a particular permit record corresponding to the permit request, wherein the one or more permit records provide an indication of an order in which one or more permit requests to obtain access to the resource were processed at the state manager.

20. The non-transitory computer-accessible storage medium as recited in claim 19, wherein at least one programmatic interface of the set of programmatic interfaces is included in a client-side component library provided by the state manager.

21. The non-transitory computer-accessible storage medium as recited in claim 19, wherein the state manager is configured to:
determine a health metric of a communication session established with the particular client process; and
in response to a determination that the health metric indicates an unhealthy state of the communication session,
remove the particular permit record from a namespace associated with the distributed application; and
provide, to a different client process of the plurality of client processes that is awaiting access to the resource, an indication of the removal of the particular permit record.

22. The non-transitory computer-accessible storage medium as recited in claim 19, wherein the state manager is configured to include, within each permit record of the one or more permit records, a respective global timestamp corresponding to a processing of a permit request associated with the permit record.

23. A non-transitory computer-accessible storage medium storing program instructions that when executed on one or more processors:
submit, from a particular client process of a distributed application comprising a plurality of client processes, to a state manager accessible to the plurality of client processes via a programmatic interface, a permit request to obtain access to a resource protected by an instance of a semaphore mechanism, wherein the state manager comprises a plurality of server nodes configured to coordinate access to a set of objects associated with the distributed application;
receive, at the particular client process in response to the permit request, an indication of one or more permit records associated with the resource, including a particular permit record associated with the permit request, wherein the one or more permit records provide an indication of a sequence in which one or more permit requests were processed at the state manager;
determine, at the particular client process, based at least in part on the one or more permit records, whether the particular client process is granted access to the resource; and
perform, by the particular client process, in response to a determination that the particular client process is granted access to the resource, one or more operations associated with the resource.

24. The non-transitory computer-accessible storage medium as recited in claim 23, wherein said programmatic interface comprises an operation defined in a client-side component library provided by the state manager.

25. The non-transitory computer-accessible storage medium as recited in claim 23, wherein the instance of the semaphore mechanism has an associated permit limit indicating the maximum number of client processes permitted to access the resource concurrently, and wherein to determine whether the particular client process is granted access to the resource, the instructions when executed on the one or more processors:
determine the number of permit records that are ahead of the particular permit record in the sequence; and
in response to a determination that the number of permit records is less than the permit limit, determine that the particular client process is granted access to the resource.

26. The non-transitory computer-accessible storage medium as recited in claim 23, wherein the instructions when executed on the one or more processors:
submit, from the particular client process to the state manager via a particular programmatic interface, a request to create a different instance of the semaphore mechanism to protect access to another resource, wherein the request to create the different instance includes respective parameters indicating (a) an identifier to be associated with the different instance and (b) a maximum number of client processes to be allowed concurrent access to the other resource; and receive, in response to the request to create the different instance, an indication from the state manager that an additional object within a namespace associated with the particular client process has been created to represent the different instance.

\* \* \* \* \*